United States Patent
Asakura et al.

[19]

[11] Patent Number: 5,835,010
[45] Date of Patent: Nov. 10, 1998

[54] AUTOMATIC ANSWERING SYSTEM USING TRANSPONDER

[75] Inventors: Fumio Asakura; Masahiro Goto, both of Okazaki; Takahide Kitahara, Nishio; Ryozo Okumura, Kariya; Kiyokazu Yoshida, Nishikasugai-gun, all of Japan

[73] Assignees: Nippon Soken, Inc., Nishio; Denso Corporation, Kariya, both of Japan

[21] Appl. No.: 753,341

[22] Filed: Nov. 22, 1996

[30] Foreign Application Priority Data

Nov. 24, 1995 [JP] Japan .................................... 7-305979

[51] Int. Cl.$^6$ .................................................. G08B 26/00
[52] U.S. Cl. ............... 340/505; 340/825.69; 340/825.72; 307/10.3
[58] Field of Search ..................... 340/505, 572, 340/825.54, 825.69, 825.72; 307/10.3, 10.5

[56] References Cited

U.S. PATENT DOCUMENTS

| | | | |
|---|---|---|---|
| 4,918,955 | 4/1990 | Kimura et al. | 70/277 |
| 5,280,633 | 1/1994 | Camiade et al. | 455/79 |
| 5,287,112 | 2/1994 | Schuermann | 342/42 |
| 5,287,113 | 2/1994 | Meier | 342/51 |
| 5,619,529 | 4/1997 | Fujioka | 375/219 |

FOREIGN PATENT DOCUMENTS

| | | |
|---|---|---|
| 267009 | 5/1988 | European Pat. Off. . |
| 628 684 | 12/1994 | European Pat. Off. . |
| 3242551 | 5/1983 | Germany . |
| 5-039767 | 2/1993 | Japan . |
| 5-067990 | 3/1993 | Japan . |
| 6-227364 | 8/1994 | Japan . |
| 2288898 | 11/1995 | United Kingdom . |

OTHER PUBLICATIONS

"RF Transponder Embedded in Auto Ignition Keys Stymies Car Thieves", Electronic Design 41 Dec. 1993 No. 25.
"Preliminary Device Specification Basestation IC", RF–Basestation IC for Communication with Philips Transponders, Philips Semiconductors, Jul. 1994.
PCF7930XP/030612 Date Sheet, Philips Semiconductors, Jul. 1994.

*Primary Examiner*—Jeffery A. Hofsass
*Assistant Examiner*—Daryl C. Pope
*Attorney, Agent, or Firm*—Cushman Darby & Cushman IP Group of Pillsbury Madison & Sutro LLP

[57] ABSTRACT

The power feeding efficiency and the communicable range of an automatic answering system are improved in an automatic answering system using a transponder which performs code communication using amplitude modulation of a carrier with an electromagnetic coupling transponder mounted in a key or the like. In a transceiver for performing the code communication with the transponder via an antenna coil, a circuit for driving the antenna coil in a transceiver based on clock is implemented by a bridge-type complementary circuit of transistors. Thereby, driving current is increased. Meanwhile, a circuit for controlling the driving mode based on a write signal is implemented by a parallel circuit of a transistor to which a power-supply voltage is applied and a resistor. Thereby, a current corresponding to a resistance of the resistor flows through the antenna coil even during the minimum driving when the transistor is turned off, thus improving the power feeding efficiency and the communicable range of the system.

18 Claims, 19 Drawing Sheets

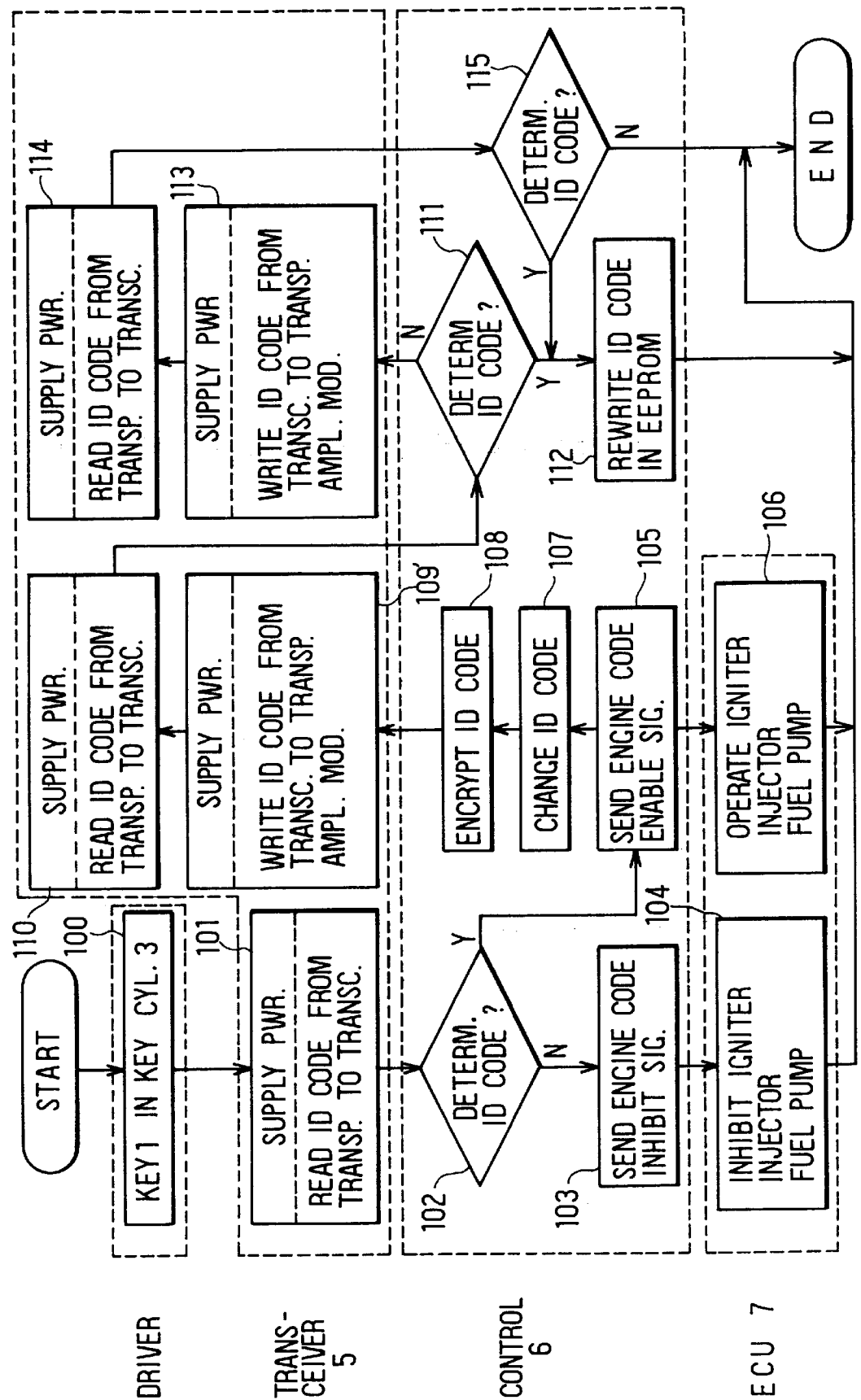

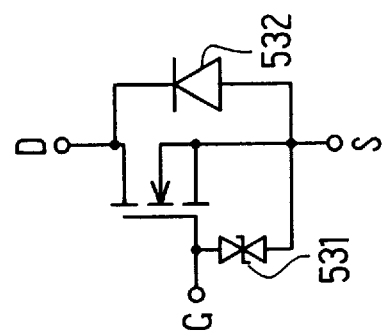
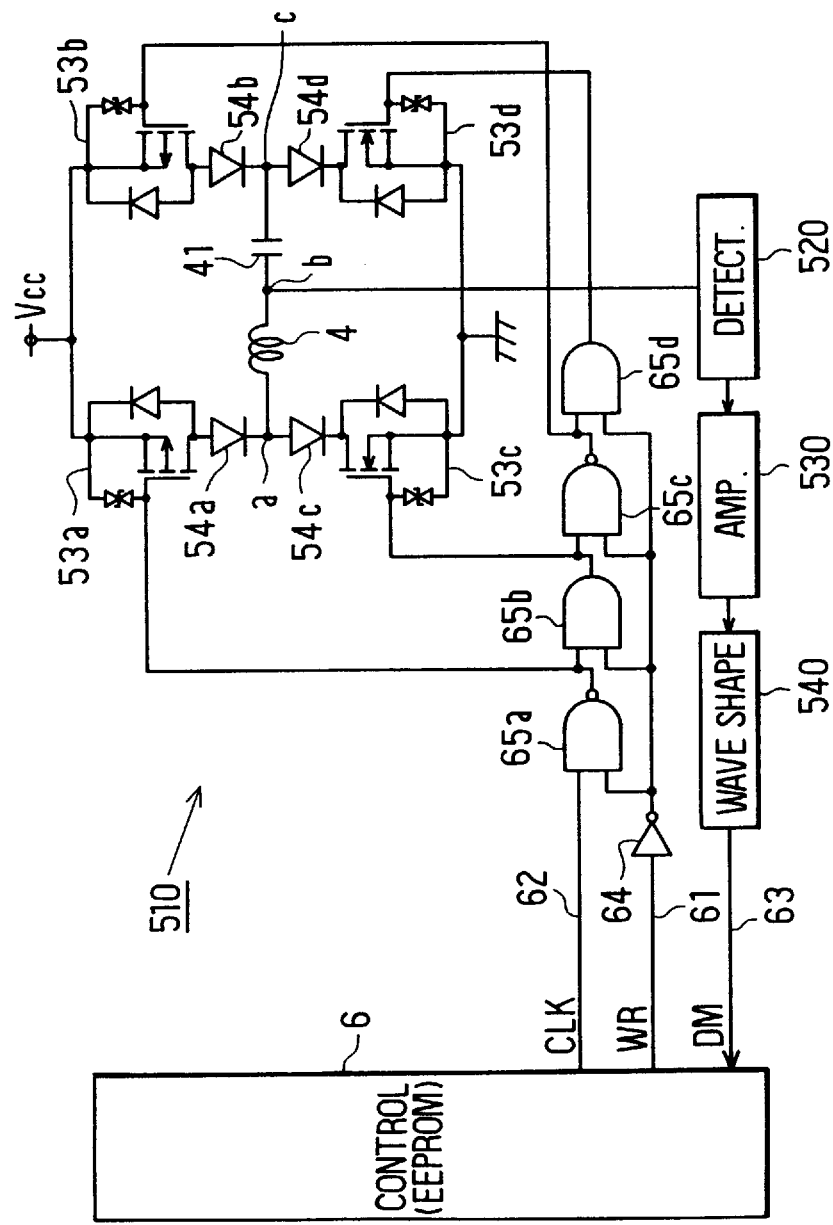

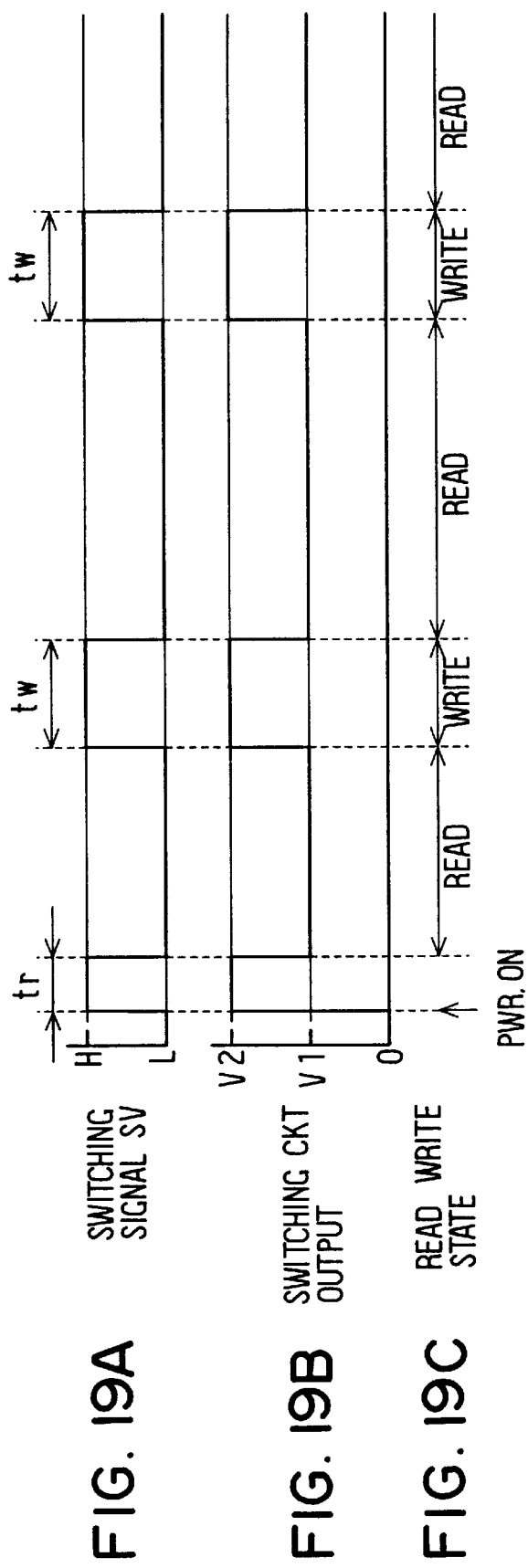
FIG. 19A  SWITCHING SIGNAL SV
FIG. 19B  SWITCHING CKT OUTPUT
FIG. 19C  READ WRITE STATE
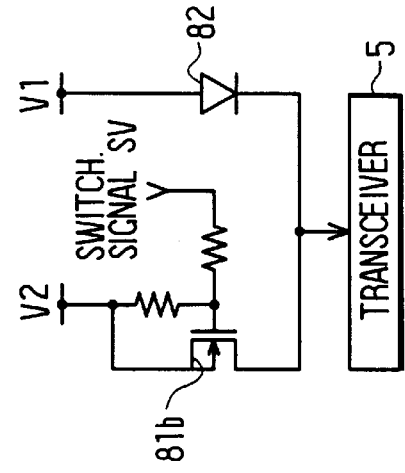
FIG. 20
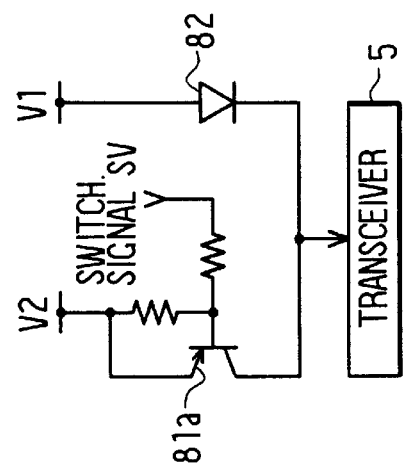
FIG. 21

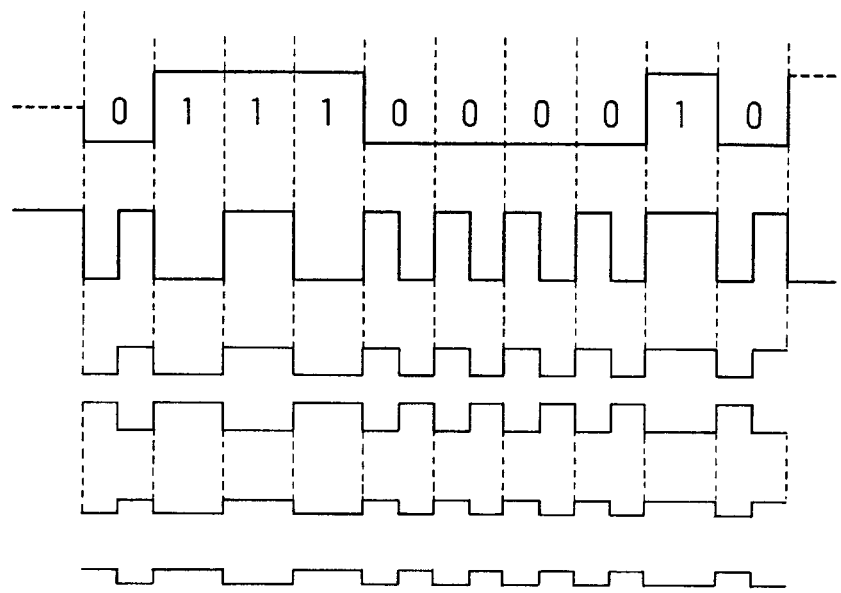
FIG. 28A PRIOR ART
FIG. 28B PRIOR ART
FIG. 28C PRIOR ART
FIG. 28D PRIOR ART
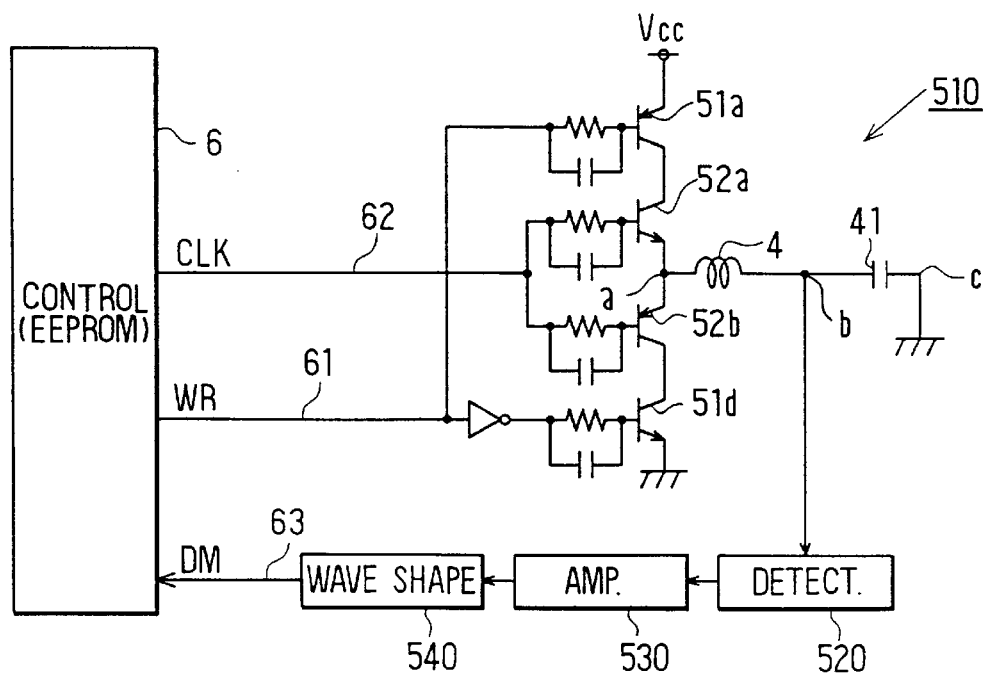
FIG. 29 PRIOR ART

FIG. 30
PRIOR ART
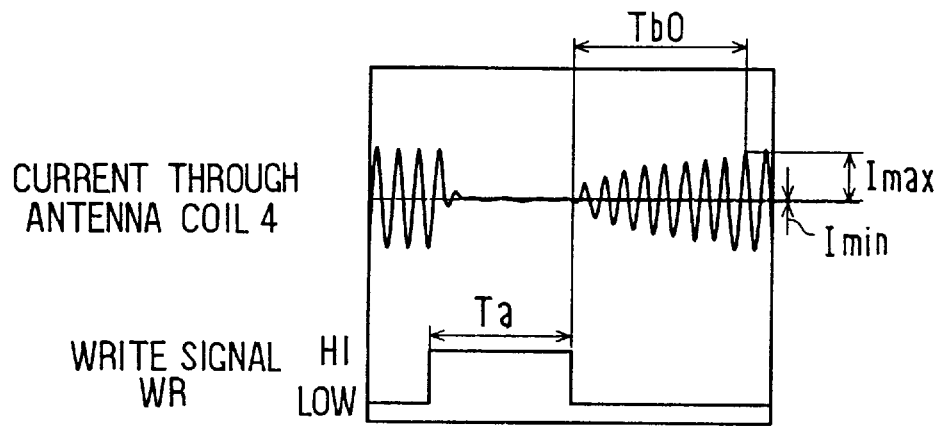
FIG. 31A
PRIOR ART
FIG. 31B
PRIOR ART
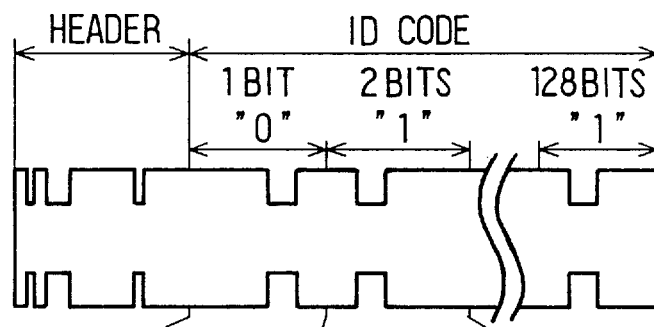
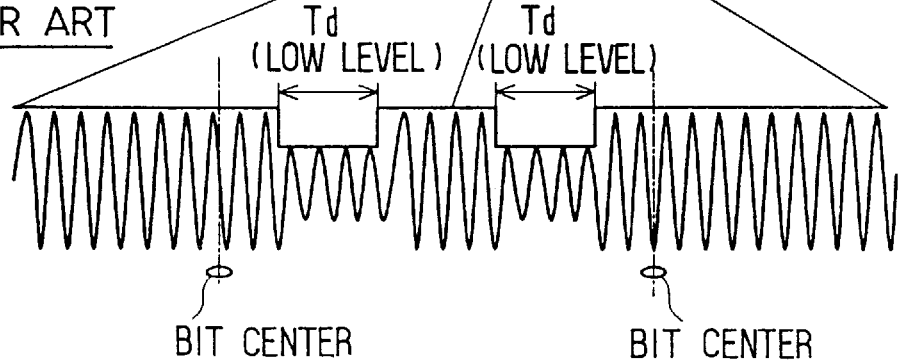

AUTOMATIC ANSWERING SYSTEM USING TRANSPONDER

CROSS-REFERENCE TO RELATED APPLICATION

The present application is related to and claims priority from Japanese Patent Application No. Hei 7-305979, incorporated herein by reference.

BACKGROUND OF THE INVENTION

1. Field of the Invention

The present invention relates to an automatic answering system using a transponder which performs code communication by way of amplitude modulation with an electromagnetic coupling transponder (automatic transponder) mounted in a key or card and more particularly to an improvement of an automatic answering system suitably applied to an anti-theft system which permits starting a car or the like as long as a code provided through the code communication is proper.

2. Description of Related Art

An anti-theft system which performs, in combination with such a mechanical key system, code communication by way of amplitude modulation between an electromagnetic coupling transponder (automatic transponder) mounted in the key in advance and which permits starting the car under the condition that a provided identification code is proper has been proposed and been put into practical use. FIG. 25 shows one example of such a conventional anti-theft system.

The anti-theft system illustrated in FIG. 25 generally includes a transponder 2 mounted in a handle portion of a key 1, a transceiver 5 which performs the code communication with the transponder 2 via an antenna coil 4 wound around a key cylinder 3 into which the key 1 is inserted and a control circuit 6 for controlling the operation of the transceiver 5.

FIG. 26 shows that the transponder 2 includes a resonance circuit composed of a coil 21 to which magnetic field BD generated by the antenna coil 4 is applied, a capacitor 22 in parallel with the coil 21 and an answering circuit 23 that answers a query made by the transceiver 5 based on a resonance signal of the resonance circuit as shown in FIG. 26.

FIG. 27 shows an electrical structure of the transponder 2 containing the answering circuit 23. As shown in FIG. 27, the transponder 2 rectifies electric power induced via an electromagnetic coupling of the antenna coil 4 with a coil 21 using a rectifier circuit 231 within the answering circuit 23 and feeds the rectified power to a communication circuit 232, a control circuit 233 and an EEPROM 234, respectively, to automatically execute a predetermined operation to provide an answer responsive to the identification code. In the answering circuit 23, the communication circuit 232 deals with the processes of (a) modulating a code (identification code) supplied from the control circuit 233 in a predetermined manner to send a modulated wave out from the coil 21 (resonance circuit) and (b) demodulating a transmitted code from the transceiver 5 received via the coil 21 to provide the demodulated signal to the control circuit 233.

The control circuit 233 deals with the processes of reading the identification code stored within the EEPROM 234 based on the above-mentioned supply to provide it to the communication circuit 232 and updating (rewriting) the identification code stored within the EEPROM 234 by the code demodulated via the communication circuit 232. The above-mentioned system is formed assuming a rolling code system by which the identification code is changed every time the key 1 is inserted into the key cylinder 3.

An answering mode of the above-mentioned identification code responded to via the answering circuit 23 will be explained briefly below with reference to FIGS. 28A–28D. In this anti-theft system, CDP codes are adopted as the codes for answering the identification code. That is, if an identification code read from the EEPROM 234 via the control circuit 233, i.e. an identification code to be answered, is one having a form as shown in FIG. 28A, for example, the communication circuit 232 CDP codes it as shown in FIG. 28B. Then, based on this CDP code, it modulates the electric power received by the coil 21 as shown in FIG. 28C.

While the transceiver 5 continues to send a carrier signal having no amplitude modulation to the transponder 2 at this time, a response signal (electric power modulated in accordance with the identification code) received via the antenna coil 4 assumes a form as shown in FIG. 28D due to the modulation thus carried out by the communication circuit 232. That is, the system on the car side including the transceiver 5 demodulates the signal received in the form shown in FIG. 28D to obtain the original identification code shown in FIG. 28A.

In such transponder 2, as is apparent from FIG. 25, there is a possibility that a resonance point of the coil 21 deviates due to an influence of a metal portion 11 of the key 1, thus reducing the received electric power. Therefore, the transponder 2 is separated from the metal portion 11 by at least 1 to 2 mm and is disposed in the direction in which the coil 21 portion is most separated from the metal portion 11 within the handle of the key 1.

Meanwhile, the transceiver 5 which is disposed on the vehicle side and which deals with the code communication between the transponder 2 via the antenna coil 4 includes a transmitting/receiving section 510, a detecting section 520, an amplifier section 530 and a waveform shaping section 540 as shown in FIG. 29.

The signal received by the antenna coil 4 in the mode shown in FIG. 28D described above is applied to the detecting section 520 via the transmitting/receiving section 510. After being detected there, it is amplified as necessary in the amplifier section 530 and is supplied to the waveform shaping section 540. The waveform shaping section 540 binarizes the detected signal to demodulate as the CDP code as shown in FIG. 28D and outputs the demodulated signal DM to the control circuit 6 via a signal line 63.

After obtaining the identification code by counting edge intervals of the demodulated signal DM thus input from the waveform shaping section 540 based on an internal clock (carrier clock) during the receiving operation (hereinafter referred to as "reading") of the transceiver 5, the control circuit 6 collates an identification code which it holds with the obtained identification code and issues a starting permission signal to an engine control unit 7 when those identification codes coincide. The engine control unit 7 exercises general control over the driving of an ignition system (igniter), an injection system (injector) and a fuel supplying system (fuel pump).

During a transmitting operation (hereinafter referred to as "writing") of the transceiver 5, the control circuit 6 switches each transistor composing the transmitting/receiving section 510 as described below to control driving (exciting) modes of the antenna coil 4. That is, the transmitting/receiving section 510 has transistors 51a and 51d which are switched based on a write signal WR applied from the control circuit 6 via a signal line 61 and transistors 52a and 52b which are switched based on the clock CLK (carrier clock) applied from the control circuit 6 via a signal line 62. The driving mode of the antenna coil 4 is controlled through the switching operation of those transistors as follows:

(1) When the write signal WR is logically at a low level, the transistors 51a and 51d are turned on and the transistors 52a and 52b alternately apply positive and negative voltages to a point a of the antenna coil 4 in synchronism with the clock CLK. At this time, a maximum current Imax flows through the antenna coil 4 and the electric power transmitted to the transponder 2 is also maximized.

(2) When the write signal WR is logically at a high sublevel, the transistors 51a and 51d are turned off. Thus, no voltage is applied to the point a of the antenna coil 4 and electric charge charged in a capacitor 41 is discharged by a capacitance of the antenna coil 4 and the capacitor 41. Then, a current flowing through the antenna coil 4 becomes a minimum current Imin and the electric power transmitted to the transponder 2 is also minimized.

FIG. 30 shows a transition of the current flowing through the antenna coil 4 along such drive control during writing. As shown in FIG. 30, the amplitude of the current flowing through the antenna coil 4 is modulated corresponding to the logic level of the write signal WR output from the control circuit 6 and the electric power transmitted to the transponder 2 is also amplitude-modulated in the mode conforming to that shown in FIG. 30. Accordingly, it becomes possible to transmit and write the identification code to the transponder 2 through such amplitude modulation by adequately selecting the logic levels of the write signal WR corresponding to the content of an identification code to be transmitted.

FIGS. 31A and 31B show a mode used in transmitting and receiving the identification code by amplitude modulation during the writing process. In writing the identification code, the control circuit 6 sets the write signal WR to a logic low level in the mode shown in FIG. 31A as a header and then sets the write signal WR to a logic low level by a predetermined period at a position after the center of a bit for the logical "0" bit and at a position before the center of a bit for the logical "1" bit, respectively, corresponding to logical contents of the identification code. Thereby, the identification code whose pulse position is modulated in the mode shown in FIG. 31A is transmitted from the transceiver 5 via the antenna coil 4 and is received by the coil 21 of the transponder 2.

The transponder 2 recognizes the magnitudes of the amplitude values of the received identification code by means of an adequate threshold voltage. Then, it recognizes whether the logical content of each bit composing the identification code is "0" or "1" by recognizing whether a period in which the amplitude value is smaller than the threshold voltage, i.e. a period Td which is determined to be at a logic low level, is located after or before the center of each recognized bit as shown in FIG. 31B. As described in connection with FIG. 27, such logical contents are recognized in the transponder 2 by the communication circuit 232 and the identification code thus recognized is written to the EEPROM 234 via the control circuit. 233. The recognition of each bit described above is made based on a count of the carrier clock.

FIG. 32 shows an operational and processing procedure of the anti-theft system in which such a rolling code system is implemented. The whole operation thereof as an anti-theft system will be explained further below with reference to FIG. 32.

When a driver inserts the key 1 into the key cylinder 3 as Step 100 in the anti-theft system shown in FIG. 25, the control circuit 6 recognizes that the key 1 has been inserted via a key unlock warning switch (key presence switch) 31 and starts to read an identification code in Step 101 based on that recognition. In reading the identification code, the electric power generated by the electromagnetic coupling is supplied from the transceiver 5 to the transponder 2 of the key 1 as described above and the identification code read from the EEPROM 234 of the transponder 2 as a result is provided to the transceiver 5 in the mode shown in FIGS. 28A–28D. The transceiver 5 demodulates the resultant identification code in the predetermined manner and outputs it to the control circuit 6. The process necessary for reading the identification code is carried out by utilizing a time from when the key 1 is inserted till when it is manipulated to the starter position, a period of about 100 ms.

Reading the identification code as described above, the control circuit 6 collates the read identification code with an identification code which it holds within its EEPROM to determine whether those identification codes coincide or not in Step 102. If this step determines that those identification codes do not coincide because the key 1 is, for example, a forged key, the control circuit 6 outputs a code instructing the engine control unit 7 to inhibit the starting of the engine in Step 103. Thereby, operations of the igniter, the injector and the fuel pump are inhibited through the engine control unit 7 (Step 104), thus preventing the car from being stolen.

On the other hand, when this step determines that those identification codes coincide, the control circuit 6 outputs a code permitting the engine control unit 7 to start the engine (issues the starting permission) in Step 105 and executes the change of the identification code to roll the codes in Step 107.

As the starting permission is issued (in Step 105), the control of the igniter, the injector and the fuel pump is started through the engine control unit 7 (Step 106) and the vehicle becomes ready to run. As the conditions for issuing the starting permission, such conditions that the door is closed, the key unlock warning switch 31 indicates that the key is present, an ignition switch 32 is switched to ignition-on and the like are normally included beside the conditions described above.

Meanwhile, in changing the identification code (Step 107), the control circuit 6 encrypts the identification code by means of random numbers as necessary in order to make it difficult to specify the identification code even if it is tapped (Step 108) and then starts to write the changed identification code in Step 109. Electric power generated by the electromagnetic coupling is supplied again from the transceiver 5 to the transponder 2 of the key 1 in writing the identification code as described above. At this time, the pulse position modulation based on the amplitude modulation is carried out in the mode as shown previously in FIGS. 31A and 31B and the identification code demodulated by the transponder 2 is written to the EEPROM 234 within the transponder 2.

After finishing changing the identification code as described above, the control circuit 6 starts reading to confirm the changed identification code in Step 110 while continuously supplying the electric power to the transponder 2 via the transceiver 5. At this time, the transponder 2 automatically responds to the identification code written in the EEPROM 234 via the control circuit 233 and the communication circuit 232 as the unmodulated carrier is continuously supplied. This answering is made in the mode previously shown in FIGS. 28A–28D similarly to the process in Step 101.

After reading the identification code, the control circuit 6 collates the read identification code with the changed identification code in Step 111 to determine whether those identification codes coincide or not. When it is determined that those identification codes coincide, the control circuit 6 rewrites the identification code which it holds within the EEPROM to the changed identification code (Step 112) and finishes the process.

As described above, it becomes possible to prevent thefts carried out by means of a forged key or the like by providing the transponder on the key side and the transceiver which performs the code communication with the transponder via the antenna coil as well as the control circuit thereof on the vehicle side as the anti-theft system in the vehicle. However, in the prior art anti-theft system described above, the current which flows through the antenna coil 4 becomes almost "zero" when the write signal WR is logically on the high level and a rise time Tb0 from when the write signal WR has turned to logic low level till when the maximum current Imax flows through the antenna coil 4 takes a very long time as shown in FIG. 30. Thus, an efficiency for supplying power from the transceiver 5 to the transponder 2 is also very low, especially during writing.

Meanwhile, in such an anti-theft system, a magnitude of the signal (voltage) which is received by the coil 21 of the transponder 2 during writing changes corresponding to a distance X from the antenna coil 4. FIGS. 33A and 33B illustrate waveforms of the signals received by the coil 21 of the transponder 2 versus distance X from the antenna coil 4 in the prior art anti-theft system.

FIG. 33A shows a waveform of the signal received by the coil 21 when the distance X from the antenna coil 4 is small and FIG. 33B shows a waveform of the signal received by the coil 21 when the distance X from the antenna coil 4 is great. In FIGS. 33A and 33B, Vth denotes a threshold voltage for determining the low level of the amplitude of the received signal when the write signal WR is set at a logic high level. As described above, the logical content of each bit composing the identification code is recognized according to whether the period Td during which the value of the amplitude of the received signal is smaller than the threshold voltage Vth (hereinafter referred to as a logic low level determination period) is present before or after the center of each recognized bit in the transponder 2. Then, normally, the logic low level determination period TdL in which the distance X from the antenna coil 4 is longer presents a greater value than the logic low level determination period TdS in which the distance X from the antenna coil 4 is shorter as shown in FIGS. 33A and 33B. However, in such transponder 2, there is a width of predetermined normalized values $Td_{min}$ to $Td_{max}$ in the logic low level determination period Td and the identification code may be written under the condition that the width of the period Td falls within those normalized values, i.e., under the condition of:

$$Td_{min} < Td\ (TdS\ or\ TDL) < Td_{max} \tag{1}$$

for the reason of demodulating the identification code corresponding to the position of the logic low level determination period Td (TdS or TdL).

In this aspect, the logic low level determination period TdL in particular presents a large value because a time "Ta+Tb0" from when the current flowing through the antenna coil 4 starts to decay till when it rises again takes a long time in the prior art anti-theft system (see FIG. 30). Due to that, the value of the period TdL is apt to deviate from the normalized value Tdmax as shown by a broken line LO in FIG. 34 when the distance X from the antenna coil 4 is great.

FIG. 34 is a graph of a relationship between the distance X from the antenna coil 4 of the transponder 2 and the logic low level determination period Td. In FIG. 34, the value of the logic low level determination period Td is inversely proportional to the distance X temporarily at the part where the distance X is short because:

when the transponder 2 is too close to the antenna coil 4, an AC magnetic field of the key cylinder 3 normally made from a non-magnetic conductor such as aluminum alloy or zinc becomes small due to an eddy current loss thereof and thereby, the voltage to be received by the coil 21 also becomes small. That is, the value of the logic low level determination period Td becomes large at that part; and the voltage received by the coil 21 is increased more by the reduced influence of the key cylinder 3 rather than the attenuation due to the distance X at the spot where the transponder 2 is separated slightly from the antenna coil 4. That is, the value of the logic low level determination period Td becomes small at the spot separated slightly from the antenna coil 4.

In any event, the efficiency of supplying power to the transponder drops and the value of the logic low level determination period Td in the transponder is also apt to deviate from the normalized value $Td_{max}$ during writing in the prior art anti-theft system. Due to that, a communicable (writable) range is greatly reduced and the reliability of the anti-theft system is consequentially lowered.

These facts are common not only to the vehicle described above but also to an automatic answering system which performs code communication by way of amplitude modulation between an electromagnetic coupling transponder mounted in a key or a card and permits an object of the anti-theft system to be operated under the condition that the answered code is proper.

SUMMARY OF THE INVENTION

The present invention has been designed in view of the above problems of the prior art, and it is an object of the present invention to provide an automatic answering system using a transponder which improves the efficiency of supplying power to the transponder, expands its communicable range by attaining an adequate logic low level determination period and increases its reliability significantly as a result.

The above objects are achieved according to a first aspect of the present invention by providing a transponder system in which the rise time until the time when the maximum current Imax flows through the antenna coil from when the write signal has turned to the logic low level is shortened, the logic low level determination period (width Td) is also shortened that much as a whole. Accordingly, as it is apparent from FIG. 34, the writable range as the communicable range is expanded. Further, the efficiency for supplying power to the transponder as well as the writable range may be changed as necessary corresponding to the added offset by adding different offsets in a plurality of stages set in advance and switching the offsets to be added automatically corresponding to the communication environment between the antenna coil and the transponder. Accordingly, even when the identification code does not coincide at one time of collation in changing the identification code as described above, for example, (see Step 111 in FIG. 32), the writing accuracy is naturally improved and the coincidence of the identification codes may be attained more easily when a greater offset value is gradually automatically selected.

Further, in such a structure, the antenna coil driving capability is increased and the value of the maximum current Imax which flows through the antenna coil when the write signal is logically at the low level is increased by providing a complementary circuit of transistors or FETs. Thereby, the efficiency for supplying power to the transponder is improved further.

The antenna coil driving capability is increased also by providing an antenna coil as part of an LC resonance circuit. In this case, a number of windings of the antenna coil is set at a number which maximizes the Q of the LC resonance circuit. Further, when such an LC resonance circuit is used, the current Imax which flows through the antenna coil when the write signal is logically at the low level and the current Imin which flows through the antenna coil when the write signal is logically at the high level may be obtained very stably corresponding to the switched logical levels of the write signal by using an LC resonance circuit which has a first capacitor charged when the antenna coil is driven at a maximum in the amplitude modulation and a second capacitor charged when the antenna coil is driven at a minimum in the amplitude modulation, and these first and second capacitors are switched and used based on the modulation control signal. Thereby, the logic low level determination period (width Td) in the transponder is shortened further and the determination period hardly changes with a change in the distance (X) from the antenna coil, thus expanding the writable range very efficiently. Such a structure using two capacitors as the LC resonance circuit is also effective in a structure which does not have add the offset.

Further, when the LC resonance circuit is adopted in the same manner and when a rectifier diode for rectifying the signal received by the antenna coil and a smoothing capacitor for smoothing the rectified signal are provided, further improvements in the efficiency for supplying power to the transponder and in expanding the writable range can be realized by forcibly moving electric charge charged in the smoothing capacitor to the resonance capacitor in switching from the minimum driving to the maximum driving of the antenna coil along the amplitude modulation. That is, in this case, the rise time until the time when the maximum current flows through the antenna coil from the time when the write signal has turned to the logic low level is shortened by the electric charge which has been forcibly moved. Because the rise time of the driving current is thus shortened, the efficiency for supplying power to the transponder is improved and the writable range is expanded as described above. This structure is also effective when the offset is not added.

Further, the efficiency for supplying power to the transponder is improved and the writable range is expanded by driving the antenna coil based on the carrier alternating signal (carrier clock) using a complementary circuit of MOSFETs or junction type FETs. That is, a driving current which rises very quickly based on the fast switching characteristics of the MOSFET or junction type FET is obtained by driving the antenna coil as described above. Thereby, because the efficiency of supplying power to the transponder is naturally improved and the logic low level determination period (width Td) in the transponder is hardly changed corresponding to the distance (X) from the antenna coil, the writable range may be expanded efficiently.

Further, in such a structure, the antenna coil driving capability may be increased further by providing an antenna coil as part of an LC resonance circuit. Because the charging and discharging of the capacitor is controlled based on the switching of the MOSFETs or junction type FETs responsive to the write signal in this case, the rise and fall characteristics of the driving current are further improved.

Meanwhile, in all of the variations described above, the sensitivity may be adjusted corresponding to the communication state between the antenna coil and the transponder and a more stable and efficient code communication may be realized by providing multiple power feeding units having different power feeding capabilities to supply power to the antenna coil, where those units are switched and used corresponding to the communication state between the antenna coil and the transponder.

In automatic answering systems using the transponder, the power is generally consumed more in transmitting the code from the antenna coil to the transponder (during writing) rather than in answering the code from the transponder to the antenna coil (during reading). Therefore, normally, the communicable range during writing is smaller than that during reading. Further, also on the side of the transponder, there is normally less electric charge stored in the transponder when the power supply is turned on, i.e., right after the transponder has received the supply of the power, as compared to the stationary state during which it provides the identification code to the antenna coil repeatedly during reading. Due to that, the communicable range when the power supply is turned on is smaller than during the stationary state even if the reading is the same.

Then, in such a case, the communicable range may be steadily expanded when the power supply is turned on or during writing while suppressing the increase of the power consumption as a whole by providing a first power feeding unit having a first power feeding capability and a second power feeding unit having a second power feeding capability which is higher than the first power feeding capability, where the second power feeding unit is selectively used when a power supply is turned on or during writing and the first power feeding unit is selectively used during reading. The structure of switching and using the power feeding units corresponding to the communication state is effective in expanding the communicable range not only when the amplitude modulation system is adopted for the code communication but also when a frequency modulation system is adopted.

Further, in addition to each structure described above, the communication sensitivity between the antenna coil and the transponder is increased and the communicable range is expanded favorably as a result by adopting a structure that where the transponder includes a magnetic flux concentrating unit for concentrating magnetic flux in an electromagnetic coupling section thereof. Suppression and minimization of the eddy current loss can be realized by adopting a laminated core having a high magnetic permeability mounted in the electromagnetic coupling section of the transponder.

Further, in each of the variations described above, if the automatic answering system is an anti-theft system which performs code communication between a transponder mounted in a portable device such as a key or card and which permits an object of the anti-theft system to be operated under the condition that the exchanged code is proper, the holder can readily determine to which transponder the antenna coil 4 is electromagnetically coupled when there is an appended key or whether or not an unintended abnormal electromagnetic coupling is taking place in the transponder 2 of the key 1 by arranging the portable device in which the transponder is mounted to have a magnetic sensor for detecting the presence of the electromagnetic coupling with the transponder and an annunciator unit for informing the holder that the electromagnetic coupling is present based on the detection made by the magnetic sensor. Thus, it becomes possible to prevent an erroneous operation which is otherwise caused by interference from the transponder mounted in the appended key or an illegitimate reading of the identification code by a person who is trying to steal the vehicle by using a portable code reader or the like. One or a plurality of display means such as a light emitting diode, a buzzer or a vibrator may be used as the annunciator. Any one of these can reliably inform the holder of the presence of the electromagnetic coupling of the transponder mounted in the portable device such as the key or card.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 7 is a flowchart of operational and processing procedures according to the second embodiment;

FIGS. 9A and 9B are circuit diagrams of a transceiver according to a third preferred embodiment of the present invention;

FIGS. 19A–19C are graphs of power-supply switching modes according to the sixth embodiment;

FIGS. 20–24 are circuit diagrams of examples of power-supply switching circuits according to the sixth embodiment;

FIGS. 28A–28D are graphs of examples of answered identification codes implemented using CDP codes;

FIG. 29 is a circuit diagram of a transceiver of an anti-theft system according to the prior art;

FIG. 30 is a graph of a waveform of an output current of a transceiver according to the prior art;

FIGS. 31A and 31B are graphs of an identification code modulating state during writing according to the prior art;

DETAILED DESCRIPTION OF THE PRESENTLY PREFERRED EXEMPLARY EMBODIMENTS

Figure 1:
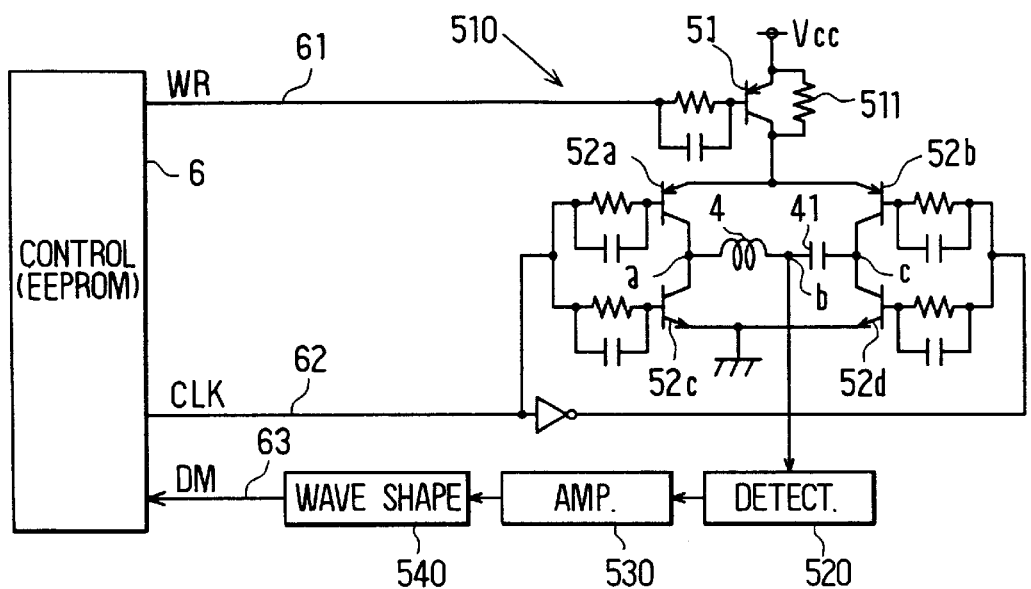
FIG. 1 is a circuit diagram of a transceiver according to a first preferred embodiment of the present invention.

FIG. 1 shows a structure of a transceiver of an automatic answering system using a transponder according to a first preferred embodiment of the present invention. In the system of the present embodiment, only the structure of the transceiver 5 is different from that of the prior art system discussed above; thus, the description of the first embodiment will focus on the transceiver 5.

In the transceiving section 510 of the transceiver 5, the antenna coil 4 is wound around the key cylinder 3 into which the key 1 is inserted as described above. Because the key cylinder 3 is normally formed from a non-magnetic material such as aluminum alloy or zinc, the smaller the inner diameter of the antenna coil 4 wound around it, the larger the loss of the AC magnetic field generated from the antenna coil 4 becomes due to the eddy current of the key cylinder 3. On the other hand, because the magnetic flux density of the antenna coil 4 is inversely proportional to the inner diameter thereof, the voltage received by the coil 21 of the transponder 2 becomes small if the inner diameter of the antenna coil 4 is too large. Therefore, the antenna coil 4 is of a size that minimizes the influence thereof within a range attachable to the key cylinder 3. The shape of the antenna coil 4 need not be circular; it may be oval or quadrangular, for example.

Further, the number of turns of the antenna coil 4 is set at a number that maximizes the Q of the LC resonance circuit formed by the coil 4 and a capacitor 41 electrically connected in series to it in the state wound around the key cylinder 3. A resonance frequency of the LC resonance circuit composed of the antenna coil 4 and the capacitor 41 is equal to that of an LC resonance circuit composed of the coil 21 and the capacitor 22 in the transponder 2.

The capacitor 41 is made of a capacitor whose dielectric tangent is small, i.e. whose loss is less. Further, if a power-supply voltage Vcc of the circuit is set at 5 V, for example, assuming that a battery voltage of the vehicle does not fluctuate even when it is started, a voltage at point b of the circuit reaches more than about ±100 V due unto the resonance of the antenna coil 4 and the capacitor 41. Due to that, a capacitor having a large rated voltage, e.g., more than ±200 V, is used for the capacitor 41.

In the transceiving section 510, PNP bipolar transistors 52a and 52b and NPN bipolar transistors 52c and 52d compose a circuit for driving the antenna coil 4 based on the clock signal CLK applied from the control circuit 6 via a signal line 62. By forming a bridge-type complementary circuit as shown in FIG. 1 as the driving circuit, its driving capability is remarkably increased in comparison with the prior art. These transistors 52a through 52d may be also FETs or MOSFETs. In any event, devices having a high current amplification factor hfe and through which more than several A (ampere) of maximum collector current flows are preferably used.

In the transmitting/receiving section 510, a P-channel transistor 51 is part of a circuit for controlling driving modes (amplitude modulating modes) of the antenna coil 4 by the driving circuit by switching based on the write signal WR applied from the control circuit 6 via a signal line 61. However, this transistor 51 is part of a parallel circuit with a resistor 511 as shown in FIG. 1 and the antenna coil 4 is driven by a small current corresponding to resistance of the resistor 511 even if the transistor 51 is turned off. Preferably, this resistance is in the range of several ohms to several hundred ohms.

Next, an operation related to writing by the driving an circuit and the driving control circuit of the transmitting/receiving section 510 constructed as described above will be explained below. At first, in the driving circuit composed of the bridge type complementary circuit of the transistors 52a through 52d, the following operations are repeated:

(1) When the clock CLK is 0 V (logically at the low level), the transistors 52a and 52d are turned on and a voltage at point a in the circuit becomes 5 V, and the transistors 52b and 52c are turned off and a voltage at point c in the circuit becomes 0 V ; and (2) When the clock CLK is 5 V (logically at the high level), the transistors 52a and 52d are turned off and a voltage at the point a in the circuit becomes 0 V , and the transistors 52b and 52c are turned on and a voltage at the point c in the circuit becomes 5 V. Therefore, a potential of 5 V is always applied between the points a and c.

Figure 2:
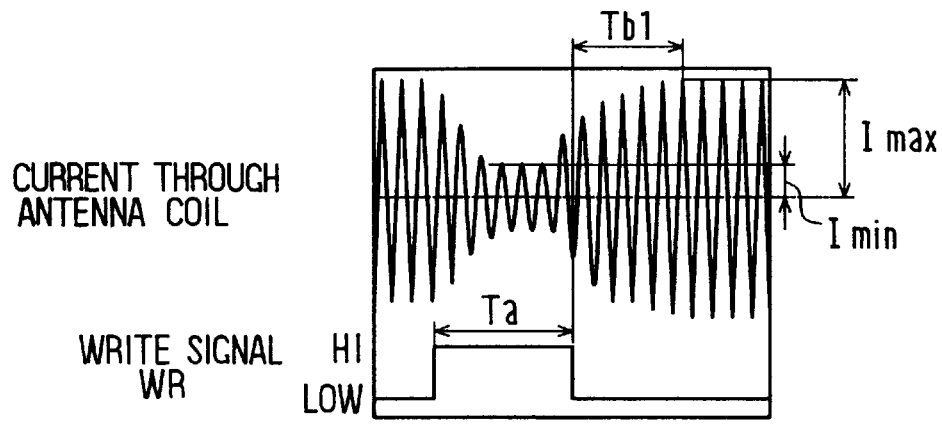
FIG. 2 is a graph of a waveform of an output current according to the first embodiment.

Meanwhile, in the driving control circuit composed of the parallel circuit of the transistor 51 and the resistor 511, the following operations are repeated:

(1) When the write signal WR is logically at the low level, the transistor 51 is turned on. At this time, the maximum current Imax flows through the antenna coil 4; and (2) When the write signal WR is logically on the high level, the transistor 51 is turned off. At this time, a current corresponding to the resistance of the resistor 511 flows through the antenna coil 4 as the minimum current Imin. FIG. 2 shows a transition of the current flowing through the antenna coil 4 during writing corresponding to such drive control. As it is apparent when FIG. 2 is compared with FIG. 30, the maximum current Imax flowing through the antenna coil 4 is considerably increased by constructing the driving circuit using the bridge type complementary circuit in the system of the first embodiment.

Further, because the offset current corresponding to the resistance of the resistor 511 as shown in FIG. 2 flows as the minimum current Imin flowing through the antenna coil 4 in the system of this embodiment, the electric power is continuously supplied to the transponder 2 and a rise time Tb until the time when the maximum current Imax flows through the antenna coil 4 from the time when the write signal WR has turned to logic low level is also shortened because of the flowing offset current as indicated as time Tb1 in FIG. 2.

Figure 3A:
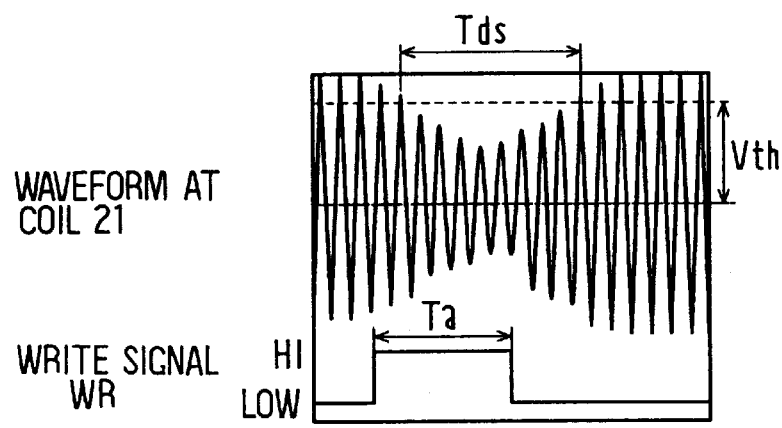
FIGS. 3A and 3B are graphs of waveforms of signals received by a transponder according to the first embodiment.
Figure 3B:
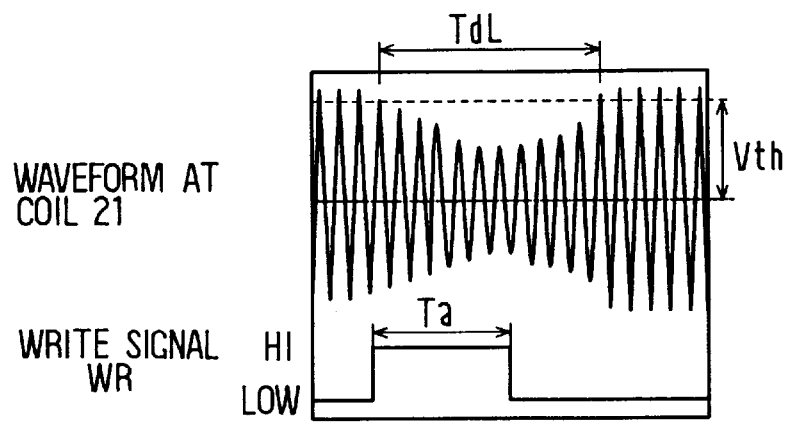
Figure 33A:
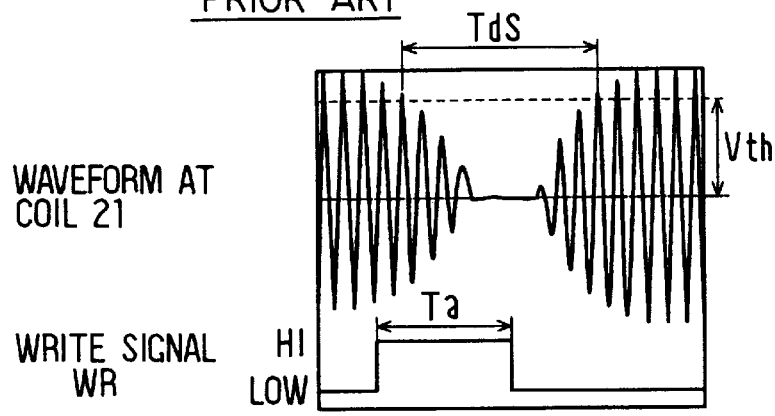
FIGS. 33A and 33B are graphs of waveforms of signals received by a transponder according to the prior art.
Figure 33B:
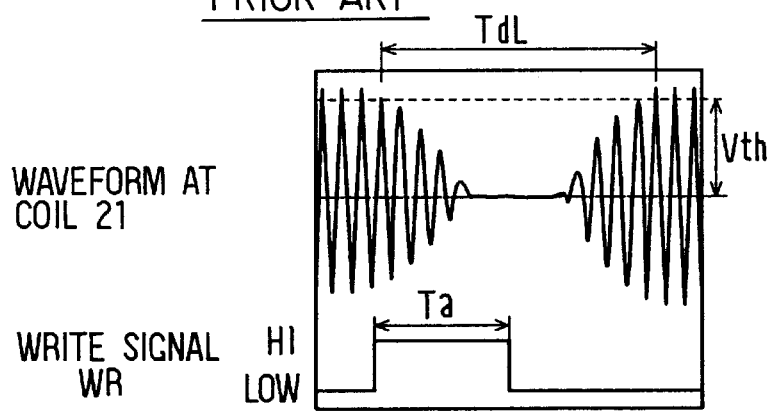

The efficiency for supplying power to the transponder 2 is steadily improved by increasing the maximum current Imax flowing through the antenna coil 4 and providing the offset current as shown in FIG. 2 as the minimum current Imin as described above. Meanwhile, because the rise time Tb until when the maximum current Imax flows through the antenna coil 4 from when the write signal WR has turned to the logic low level is thus shortened, the logic low level determination period (width Td) on the transponder 2 side is also shortened as a whole. FIGS. 3A and 3B show waveforms of signals received by the coil 21 of the transponder 2 in the first embodiment in correspondence to those in FIGS. 33A and 33B. That is, FIG. 3A shows a waveform of a signal received by the coil 21 when the distance X from the antenna coil 4 is short and FIG. 3B shows a waveform of a signal received by the coil 21 when the distance X from the antenna coil 4 is long. Further, in FIGS. 3A and 3B, Vth denotes a threshold voltage for determining whether an amplitude of the received signal is at a logic low or not when the write signal WR is controlled to the logic high level. In the transponder 2, the logical content of each bit composing the identification code is recognized by determining whether the logic low level determination period Td is located before or after the center of each recognized bit as described before. Then, normally, the logic low level determination period TdL when the distance X from the antenna coil 4 is long results in a greater value than the logic low level determination period TdS when the distance X from the antenna coil 4 is short as shown in FIGS. 3A and 3B.

Figure 34:
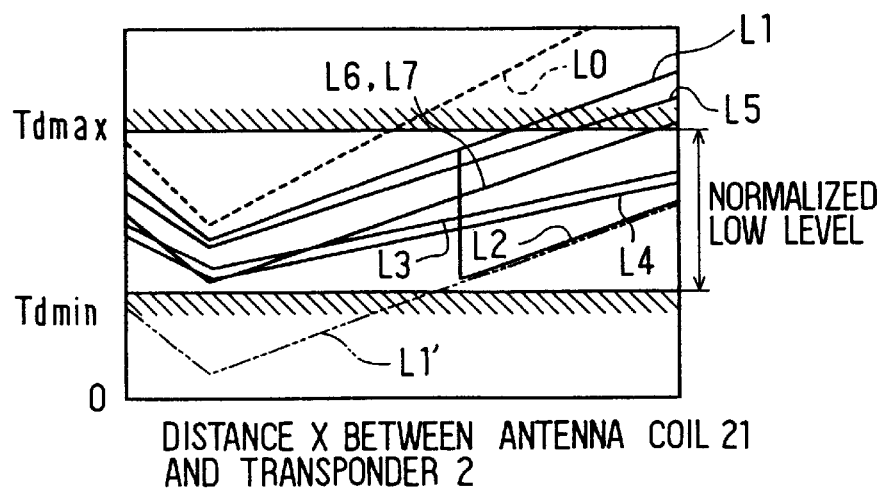
FIG. 34 is a graph of a relationship between a logic low level determination period Td and a distance X.

However, in the system of the first embodiment, these logic low level determination periods TdS and TdL are both shortened by allowing the offset current to flow through the antenna coil 4 as shown in FIG. 2 as the minimum current Imin. Thereby, the writable range of the present system represented as the function of the distance X from the antenna coil 4 to the transponder 2 is expanded favorably in a manner indicated by a solid line L1 in FIG. 34. In FIG. 34, it has been described before that the reasons why the value of the logic low level determination period Td is inversely proportional to the distance X temporarily at the part where the distance X is short are:

when the transponder 2 is too close to the antenna coil 4, a magnetic field of the key cylinder 3 becomes small due to its eddy current loss and thereby, the voltage to be received by the coil 21 becomes also small. That is, the value of the logic low level determination period Td becomes large at that part; and the voltage received by the coil 21 is increased more by the reduced influence of the key cylinder 3 rather than the attenuation due to the distance X at the spot where the transponder 2 is separated slightly from the antenna coil 4. That is, the value of the logic low level determination period Td becomes small at the spot separated slightly from the antenna coil 4.

As described above, the automatic answering system of the first embodiment brings about desirable excellent effects in improving the reliability as the automatic answering system, as follows:

(A) The efficiency of supplying power to the transponder 2 is steadily improved by increasing the maximum current Imax flowing through the antenna coil 4 and by flowing the offset current as the minimum current Imin; and (B) Because the rise time Tb until the time when the maximum current Imax flows through the antenna coil 4 from the time when the write signal WR has turned to a logic low level is shortened, the logic low level determination period Td on the transponder 2 side is shortened as a whole and the writable range is also expanded favorably.

In the system of the present embodiment, a relationship between the resistance of the resistor 511 and the waveform of the output current shown in FIG. 2 cannot be defined solely by:

types of the transistors 51 and 52a through 52d;

electrical characteristics of the antenna coil 4; and the dimension and material of the key cylinder 3.

Figure 4:
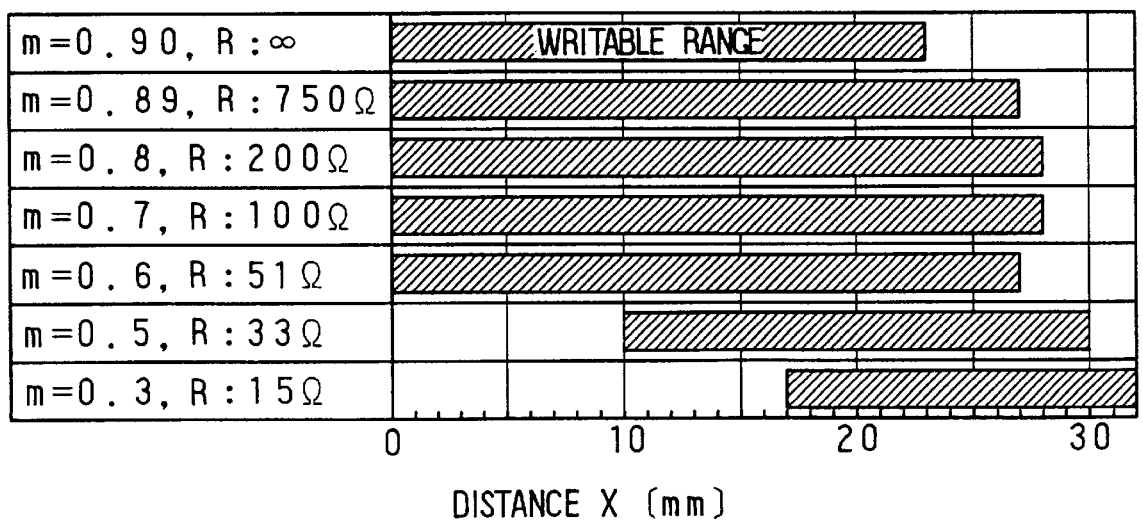
FIG. 4 is a chart of a relationship between a writable range and a modulation factor according to the first embodiment.

Then, the result shown in FIG. 4 could have been obtained by finding a modulation factor m based on the maximum value Imax and the minimum value Imin of the waveform of the output current in a form of:

$$m=(Imax-Imin)/(Imax+Imin) \quad (2)$$

and by evaluating the writable range by the modulation factor m.

It can be seen from FIG. 4 that the writable range changes corresponding to the modulation factor m and that the writable range is maximized when the modulation factor m is 0.7 (i.e., the resistance of the resistor 511 is 100Ω) to 0.8 (resistance of the resistor 511 =200Ω).

Further, while the writable distance X extends if the modulation factor m is small, writing is disabled in the part where the distance X is short if the modulation factor m is too small (e.g. =0.3 through 0.5). It is because the logic low level determination period Td on the transponder 2 side is reduced more than the normalized value Tdmin in the condition of the aforementioned equation (1) and the transponder 2 cannot recognize it as the identification code. The relationship between the distance X at that part and the logic low level determination period Td is indicated by a two-dot chain line L1' in FIG. 34. Thus, the logic low level determination period Td is changed also by the modulation factor m and the writable range is changed as a result. That is, in the system of the first embodiment, the writable range may be expanded corresponding to the value of the modulation factor m.

According to the above-mentioned equation (2), the modulation factor m becomes "0" when "Imax=Imin" and it becomes "1" when "Imin=0". Then, in the circuit of the first embodiment illustrated in FIG. 1, the smaller the resistance of the resistor 511, the larger the value of the Imin and the smaller the modulation factor m become.

Further, although the maximum current Imax has been increased by adopting the bridge type complementary circuit for the driving circuit of the antenna coil 4 in the system of the present embodiment, the driving circuit need not be of the bridge type. That is, even if the current at the same level as that of the prior art system is supplied to the antenna coil 4 as the maximum current Imax, the efficiency for supplying power to the transponder 2 may be steadily improved and the writable range may be expanded by adding the offset to the minimum current Imin in the manner described above.

Further, the above-mentioned driving circuit need not be constructed when a sufficient power supply for the code communication between the transponder 2 is realized only through the antenna coil 4.

[Second Embodiment]

Figure 5:
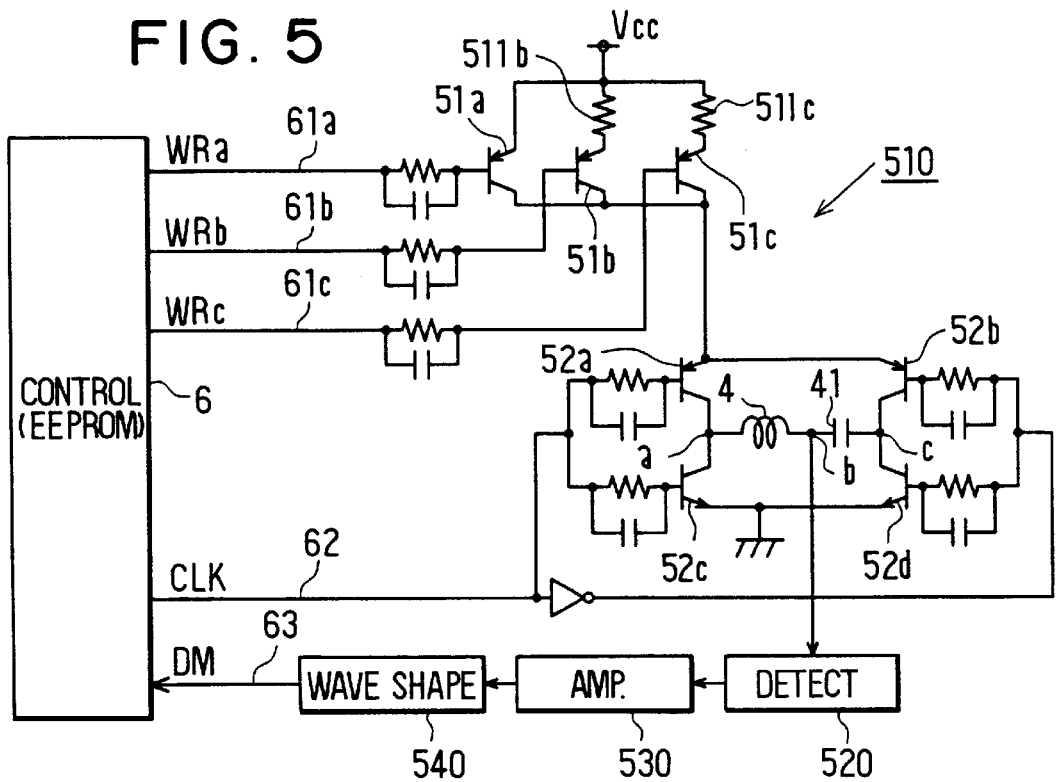
FIG. 5 is a circuit diagram of a structure of a transceiver according to a second preferred embodiment of the present invention.

FIG. 5 shows a second embodiment of an automatic answering system using a transponder according to the present invention. In the system of the second embodiment, only the circuit section for controlling the driving mode of the antenna coil 4 is different in the transceiver from that of the system of the first embodiment. Thus, only the structure and operation of the different section will be explained below for convenience. That is, in the transceiver of the automatic answering system of the second embodiment shown in FIG. 5, the transceiving section 510 thereof includes a driving control circuit having PNP transistors 51a and 51b and NPN transistor 51c which are turned on and off based on write signals WRa through WRc applied from the control circuit 6 respectively via signal lines 61a through 61c.

Here, the transistors 51a through 51c are electrically connected in parallel and among them, the transistor 51b is connected to a resistor 511b and the transistor 51c is connected to a resistor 511c in series. While resistances of those resistors 511b and 511c are selected within a range of several ohms to several hundreds ohms similarly to the resistor 511 used in the first embodiment, the magnitude of those resistances are set in advance in a relationship of:

resistor 511b resistance>resistor 511c resistance

Figure 6A:
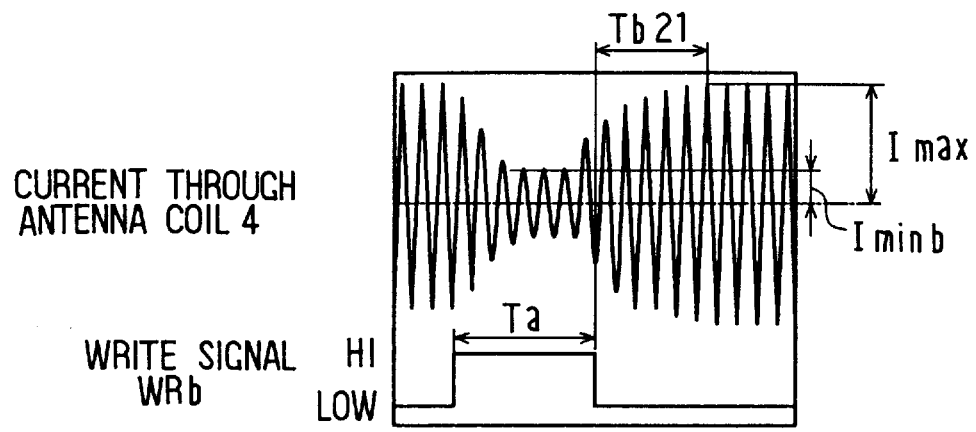
FIGS. 6A and 6B are time charts of waveforms of an output current according to the second embodiment.
Figure 6B:
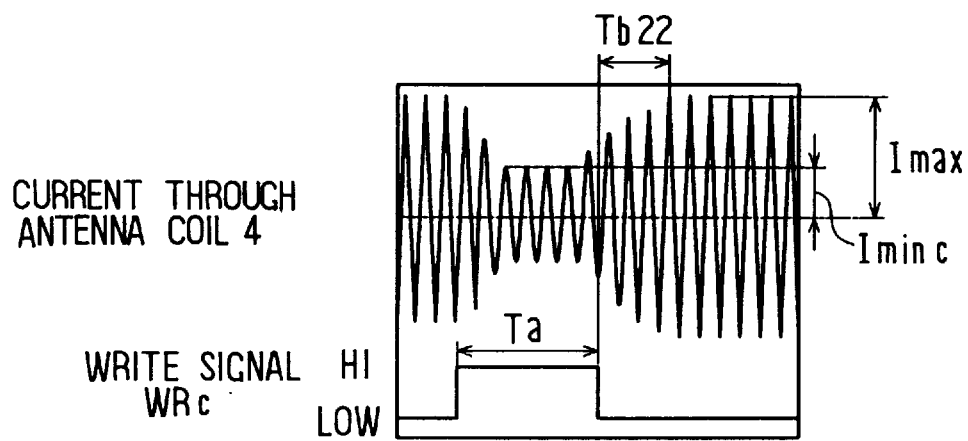

Then, based on the write signals WRa through WRc selectively controlled to a logic low level during writing through the control circuit 6, the driving control circuit creates two ways of driving control (amplitude modulation) as shown in FIGS. 6A and 6B based on a combination of the current Imax and a current Iminb and that of the current Imax and a current Iminc by executing the following operations:

(1) the transistor 51a is selectively turned on when the write signal WRa turns to a logic low level and the other write signals WRb and WRc turn to a logic high level. At this time, the maximum current Imax flows through the antenna coil 4;

(2) the transistor 51b is selectively turned on when the write signal WRb turns to a logic low level and the other write signals WRa and WRc turn to a logic high level. At this time, the current Iminb corresponding to the resistance of the resistor 51b flows through the antenna coil 4 as the current Imin; and (3) the transistor 51c is selectively turned on when the write signal WRc turns to a logic low level and the other write signals WRa and WRb turn to a logic high level. At this time, the current Iminc corresponding to the resistance of the resistor 511c flows through the antenna coil 4 as the current Imin.

FIG. 6A shows a transition of the current flowing through the antenna coil 4 when the transistors 51a and 51b turn on alternately and FIG. 6B shows a transition of the current flowing through the antenna coil 4 when the transistors 51a and 51c turn on alternately.

Here, because the resistances of the resistors 511b and 511c are set in the relationship of:

resistor 511b resistance>resistor 511c resistance, and a relationship of Iminb<Iminc as shown in FIGS. 6A and 6B holds among the currents Imin described above and the value of the modulation factor m defined in the aforementioned equation (2) is different when the transistors 51a and 51b turn on alternately from that when the transistors 51a and 51c turn on alternately.

Then, in the relationship between the modulation factor m and the writable distance X shown in FIG. 4, the writable range as the whole system may be expanded further by selecting each of the resistances of the resistors 511b and 511c such that, for example:

the modulation factor m at the time when the transistors 51a and 51b turn on alternately is 0.7; and the modulation factor m at the time when the transistors 51a and 51c turn on alternately is 0.3.

At this time, the logic low level determination period Td on the transponder 2 side is also shortened further as compared to the system of the first embodiment and it progresses in a manner that the solid line L1 and the two-dot chain line L1' which fall between the normalized values Tdmin and Tdmax are combined as indicated by a solid line L2 in FIG. 34.

Figure 32:
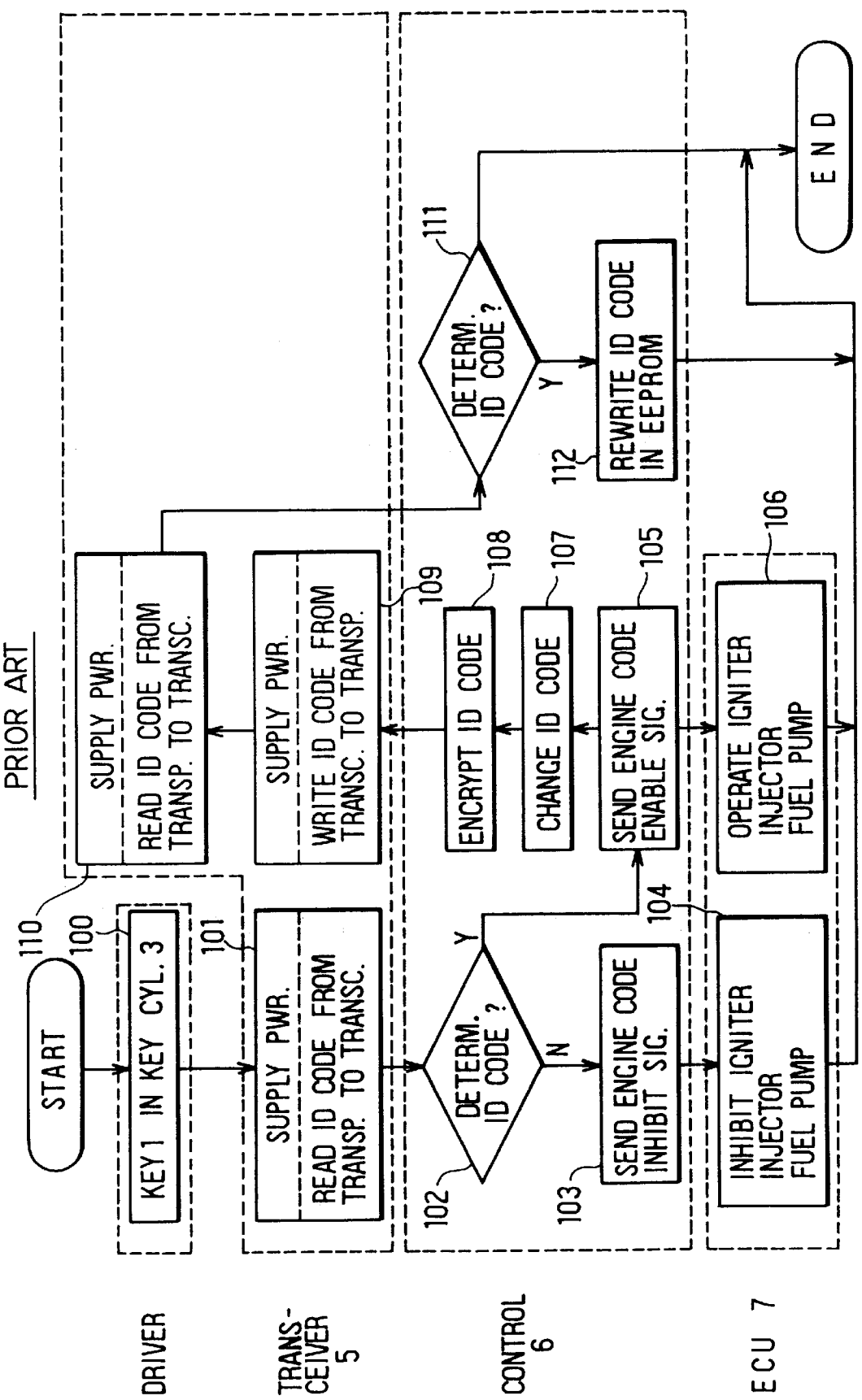
FIG. 32 is a flowchart of an operational and processing procedures of an said anti-theft system according to the prior art.

FIG. 7 shows an operational and processing procedure of the system of the second embodiment in correspondence with the flowchart of FIG. 32. The operation thereof as the automatic answering system of the second embodiment will be explained in detail below with reference to FIG. 7. The same or corresponding processes with those in FIG. 32 are denoted by the same or corresponding Step Nos. and that an overlapped explanation of those processes will be omitted here.

When it is determined that the identification code coincides in the process of Step 102, the control circuit 6 executes the step for changing the identification code for rolling the code in Step 107 after issuing the starting permission to the engine control unit 7 in Step 105 also in the system of the second embodiment. It has been also described that at this time, the identification code is encrypted by means of random numbers and the like as necessary in the process in Step 108 in order to make it difficult to specify the identification code even if it is tapped. In the system of the second embodiment, however, driving (amplitude modulation) is done by means of the transistors 51a and 51b as a process in Step 109'.

Then, when the writing is carried out normally to the transponder 2 by this driving (amplitude modulation) and when it is determined that those changed identification codes coincide in Step 111, the control circuit 6 rewrites the identification code which it holds within the EEPROM thereof to the changed code in Step 112 and finishes the pertinent process as described before. When it is determined that the identification codes do not coincide in Step 111, the following processes are carried out further. That is, in this case, driving (amplitude modulation) by means of the transistors 51a and 51c is carried out this time as a process in Step 113 in the system of the second embodiment. It has been described that the amplitude modulation by the transistors 51a and 51c allows the wider writable range to be maintained.

Then, after that, the identification code read from the transponder 2 is compared with the changed identification code in Steps 114 and 115 similarly to Steps 110 and 111. When it is determined that those identification codes coincide, the process in Step 112 is executed, thus finishing the pertinent processes. On the other hand, the rewriting of the identification code within the EEPROM which the control circuit 6 contains is stopped in the same manner as described before when the changed identification code does not still coincide by reasons of:

the identification code could have been written only partly because the key 1 was pulled out while writing the identification code; or there has been a conductor or a magnet that might have interrupted the magnetic field BD generated from the antenna coil 4.

However, in case of the system of the second embodiment, because the rewriting is carried out through amplitude modulation by means of the transistors 51a and 51c which allows the wide writable range, the probability for normally attaining the change of the identification code is improved.

As described above, in addition to the effects (A) and (B) of the first embodiment, the automatic answering system of the second embodiment brings about the effect of:

(C) the efficiency for supplying power to the transponder 2 and the writable range may be changed as an necessary and the writing accuracy may be improved further.

Although the bridge type complementary circuit has been adopted for the driving circuit of the antenna coil 4 to increase the maximum current Imax also in the system of the second embodiment, the driving circuit need not be of the bridge type.

Figure 8:
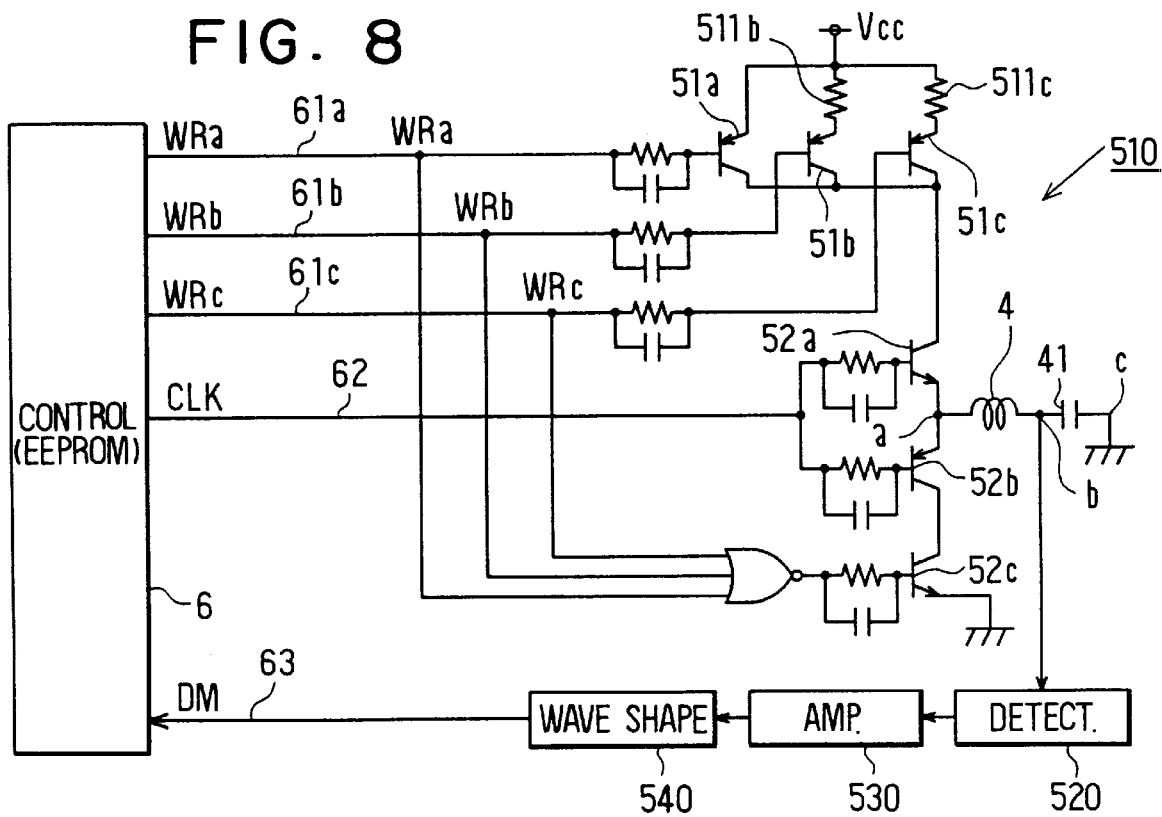
FIG. 8 is a circuit diagram of a modification of the transceiver according to the second embodiment.

FIG. 8 shows a structure of the transceiver in which the prior art driving circuit is combined with the driving control circuit of the second embodiment for reference. The structure of FIG. 8 also allows the efficiency for supplying power to the transponder 2 to be improved and the writable range to be expanded by allowing the offset current of Iminb or Iminc to flow to the antenna coil 4.

[Third Embodiment]

FIGS. 9A and 9B show a third embodiment of an automatic answering system using a transponder according to the present invention. In the system of the third embodiment, a bridge type complementary circuit using MOSFETs 53a through 53d as shown in FIG. 9A is adopted as a driving circuit of the antenna coil 4 in the transceiving section 510 of the transceiver. Among these MOSFETs 53a through 53d, the MOSFETs 53a and 53b are P-channel MOSFETs and the MOSFETs 53c and 53d are N-channel MOSFETs. Further, any one of those MOSFETs has a withstand voltage between drain and source thereof which is higher than a maximum voltage at the point b in the circuit and whose on resistance is low in order to increase the current flowing through the antenna coil 4. FIG. 9B shows an internal circuit of a typical N-channel MOSFET for reference.

As shown in FIG. 9B, in those MOSFETs, a gate protecting diode 531 is generally provided between a gate G and a source S and an internal diode 532 is provided between a drain D and the source S. Therefore, current flows backward when an inverse voltage between the drain and the source becomes higher than a forward voltage of the internal diode 532. In FIG. 9A, diodes 54a through 54d inserted among the MOSFETs 53a through 53d prevent such reversed current flow based on the counter-electromotive force generated at the points a and c in driving the antenna coil 4. The rated reverse voltage of those diodes 54a through 54d is greater than the maximum voltage at the point b.

Meanwhile, on/off modes of the MOSFETs 53a through 53d in the driving circuit are controlled based on the clock CLK applied from the control circuit 6 via the signal line 62 and gate circuits 65a through 65d and the write signal WR applied via an inverter 64 and the gate circuits 65a through 65d in the following manner:

(1) When the write signal WR is logically at the high level, the gate level of the MOSFETs 53a and 53b are both logically at the high level, the gate level of the MOSFETs 53c and 53d are both logically at the low level and all of the MOSFETs 53a through 53d are turned off. That is, during this time, the current hardly flows through the antenna coil 4 and electric charge charged in the capacitor 41 is held without leakage by the diodes 54a and 54d and the MOSFETs 53c and 53d; and (2) When the write signal WR turns to a logic low level on the other hand, all of the MOSFETS 53a through 53d are turned on in contrast to the above case (1) and the antenna coil 4 is driven. Then, because the electric charge charged in the capacitor 41 is discharged at once at this time, the current Imax which flows through the antenna coil 4 rises up very quickly.

Figure 10:
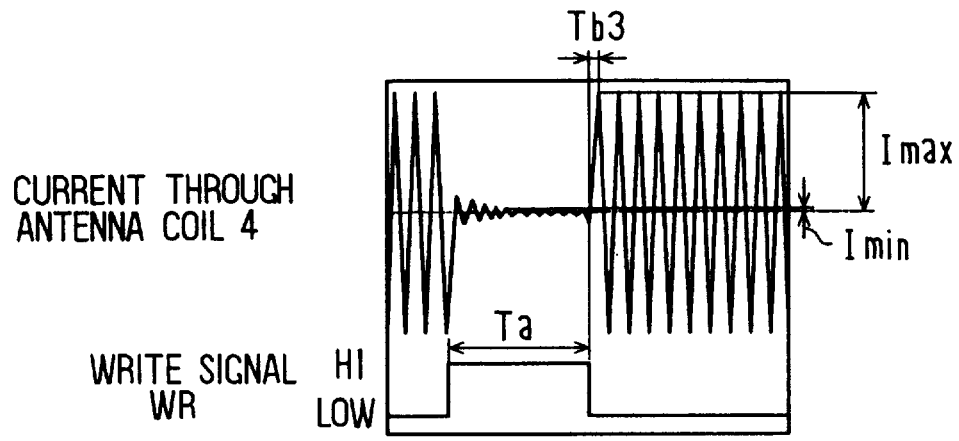
FIG. 10 is a graph of a waveform of an output current according to the third embodiment.

FIG. 10 shows a transition of the current flowing through the antenna coil 4 corresponding to such an operation of the driving circuit during writing. As shown in FIG. 10, because the very sharp transition of current is obtained in driving the antenna coil 4 in the system of the third embodiment, the efficiency for supplying power to the transponder 2 is improved and the logic low level determination period Td in the transponder 2 hardly changes corresponding to the distance X from the antenna coil 4.

Figure 11A:
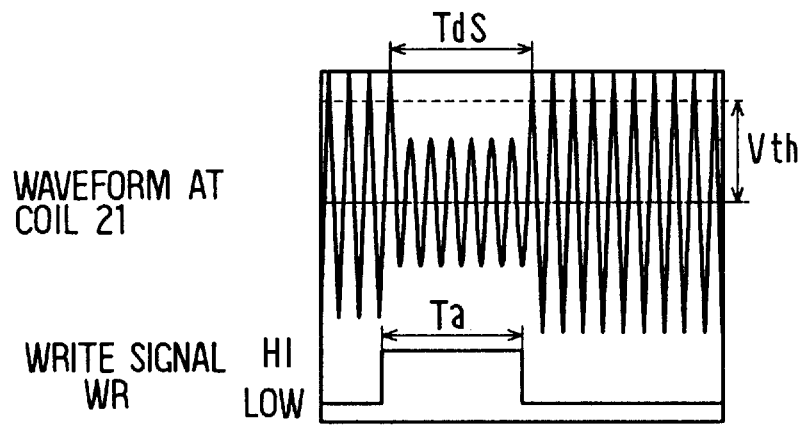
FIGS. 11A and 11B are graphs of waveforms of signals received by a transponder according to the third embodiment.
Figure 11B:
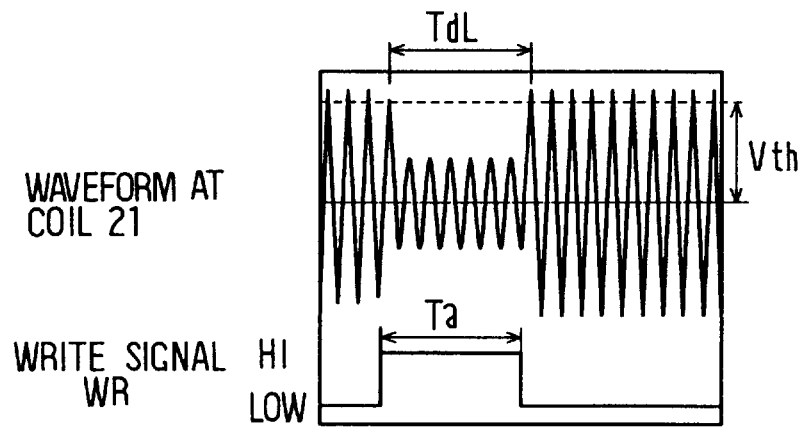

FIGS. 11A and 11B show waveforms of the signals received by the transponder 2 in the system of the third embodiment in correspondence to those shown in FIGS. 33A and 33B and FIGS. 3A and 3B.

As shown in FIGS. 11A and 11B, both the logic low level determination periods TdS and TdL are shortened considerably and a difference between those determination periods TdS and TdL is also shortened in the system of the third embodiment. Therefore, the transition of the logic low level determination period Td corresponding to the distance X becomes moderate as indicated by a solid line L3 in FIG. 34 and the writable range may be expanded very efficiently.

As described above, the automatic answering system of the third embodiment allows the efficiency for supplying power and the writable range to be improved considerably even more than the first and second embodiments.

Junction type FETs may be used instead of the MOSFETs 53a through 53d when less current flows through the antenna coil 4 in the third embodiment.

[Fourth Embodiment]

Figure 12:
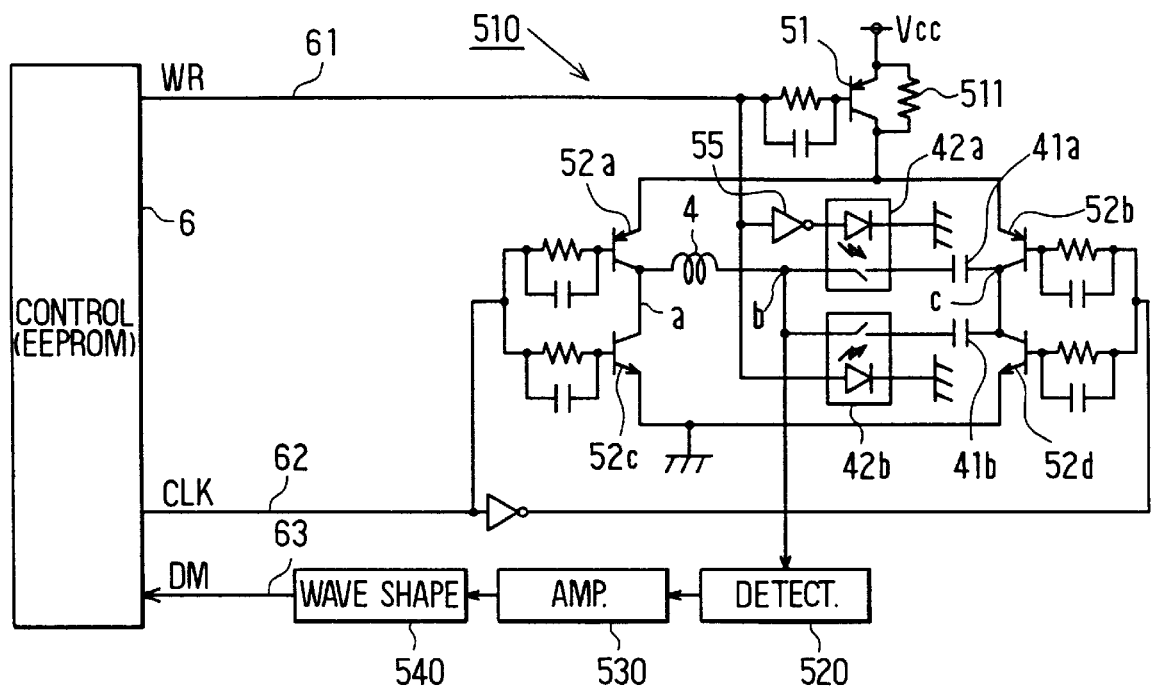
FIG. 12 is a circuit diagram of a transceiver according to a fourth preferred embodiment of the present invention.

FIG. 12 shows a fourth embodiment of an automatic answering system using a transponder according to the present invention. Only the structure of the transceiver is different from that of the prior art system shown in FIG. 29 or of the systems of the first through third embodiments also here.

In the system of the fourth embodiment, resonance capacitors 41a and 41b are provided in parallel in the transceiver of the first embodiment as shown in FIG. 12. These capacitors 41a and 41b are selectively used as a switch 42a or a switch 42b is turned on, respectively. While the switch 42a is turned on or off based on a logic inversion signal of the write signal WR via an inverter 55 and the switch 42b is turned on or off based on the write signal WR itself, opto-couplers for isolating those signals are used for the switches 42a and 42b because the voltage at the point b within the circuit is much higher than the logic high level of the write signal WR.

Next, the operation of the transceiving section 510 during writing will be explained. In the transceiving section 510 constructed as described above, the driving circuit and the driving control circuit execute the following operations repeatedly based on the write signal WR:

(1) When the write signal WR is logically at the low level, the switch 42a is turned on and driving based on the resonance between the antenna coil 4 and the capacitor 41a takes place in the driving circuit. Further, because the transistor 51 is turned on in the driving control circuit at this time, the maximum current Imax flows through the antenna coil 4. Then, because one terminal of the other capacitor 41b is released at this time, electric charge charged in the capacitor 41b at that moment is held without leakage; and (2) When the write signal WR is logically on the high level, the switch 42b is turned on and driving based on the resonance between the antenna coil 4 and the capacitor 41b takes place in the driving circuit. Further, because the transistor 51 is turned off in the driving control circuit at this time, a current that corresponds to the resistance of the a resistor 511 flows through the antenna coil 4 as the current Imin. Then, because one terminal of the other capacitor 41a is released at this time, electric charge charged in the capacitor 41a at that moment is held without leakage.

Figure 13:
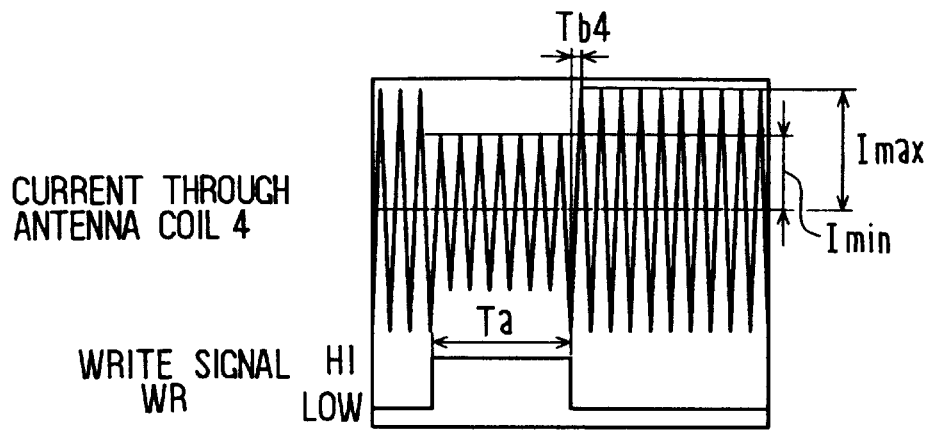
FIG. 13 is a graph of a waveform of an output current according to the fourth embodiment.

FIG. 13 shows a transition of the current flowing through the antenna coil 4 corresponding to such an operation of the transceiving section 510 during writing. As shown in FIG. 13, because the electric charge charged in the capacitors 41a and 41b are held as they are in driving the antenna coil 4 in the system of the fourth embodiment, the current that flows through the antenna coil 4 decays from Imax to Imin and rises from Imin to Imax very sharply. That is, the logic low level determination period Td in the transponder 2 hardly changes corresponding to the distance X from the antenna coil 4 also in this case. Further, because the offset current corresponding to the resistance of the resistor 511 also flows through the antenna coil 4 as the current Imin described above, the efficiency for supplying power to the transponder 2 is improved further favorably.

Figure 14A:
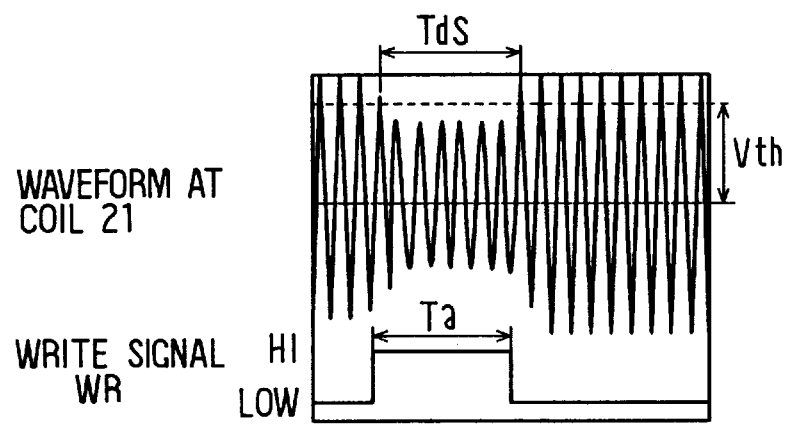
FIGS. 14A and 14B are graphs of waveforms of signals received by a transponder according to the fourth embodiment.
Figure 14B:
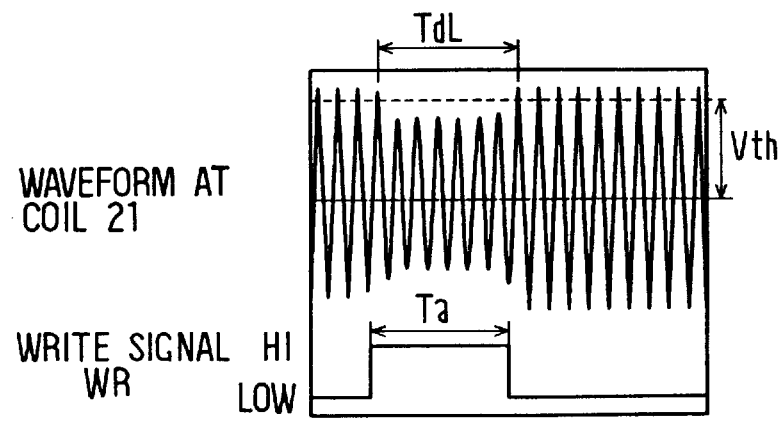

FIGS. 14A and 14B show waveforms of the signals received by the transponder 2 in the system of the fourth embodiment in correspondence to those shown in FIGS. 33A and 33B, 3A and 3B and 11A and 11B.

As shown in FIGS. 14A and 14B, because the offset current Imin is added, the logic low level determination periods TdS and TdL are both shortened considerably even more than in the third embodiment and the difference between those determination periods TdS and TdL is also shortened in the system of the fourth embodiment. Therefore, the transition of the logic low level determination period Td corresponding to the distance X is as shown by the solid line L4 in FIG. 34 and the writable range may be expanded even more efficiently.

As described above, the automatic answering system of the fourth embodiment allows the efficiency for supplying power and the writable range to be improved considerably even more than the first through third embodiments. The bridge type complementary circuit has been adopted for the driving circuit of the antenna coil 4 also in the system of the fourth embodiment in order to increase the maximum current Imax, the driving circuit needs not be always the bridge type. That is, even if the current at the same level as in the prior art is supplied to the antenna coil 4 as the maximum current Imax, the efficiency for supplying power to the transponder 2 is steadily improved and the writable range is expanded by adding the offset current Imin in the manner described above. Further, the circuit structure including the two capacitors 41a and 41b as the LC resonance circuit is effective also when no circuit for adding the offset current Imin as described above is provided as the driving control circuit.

[Fifth Embodiment]

Figure 15:
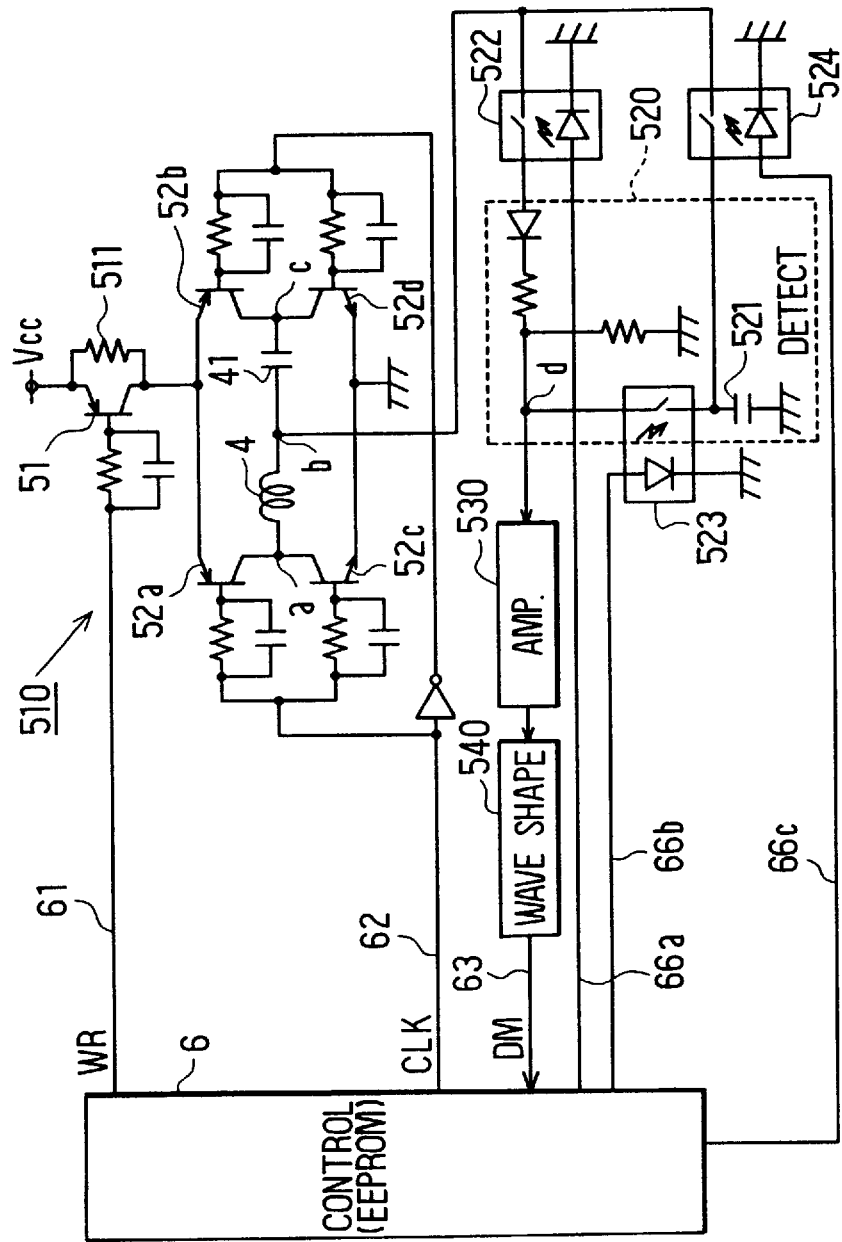
FIG. 15 is a circuit diagram of a transceiver according to a fifth preferred embodiment of the present invention.

FIG. 15 shows a fifth embodiment of an inventive automatic answering system using the transponder. Only the structure of the transceiver is different from that of the prior art system shown in FIG. 29 or of the systems of the first through fourth embodiments also here. In the system of the fifth embodiment, switches 522, 523 and 524 are provided as shown in FIG. 15 in the detecting section 520 of the transceiver of the first embodiment to forcibly move electric charge charged in a detecting capacitor (smoothing capacitor) 521 to the resonance capacitor 41 in switching from the minimum driving to the maximum driving of the antenna coil 4 during the amplitude modulation.

Here, the switches 522, 523 and 524 are turned on and off based on control signals applied from the control circuit 6 via signal lines 66a, 66b and 66c, respectively. However, even if a power supply voltage Vcc is around 5 V, the magnitude of the voltage at the point b within the circuit rises to several hundred volts due to the LC resonance between the antenna coil 4 and the capacitor 41, so that opto-couplers which can isolate those signals are used for the switches 522, 523 and 524.

Next, the operations of the transceiving section 510 and the detecting section 520 in the transceiver during writing will be explained. In the transceiver constructed as described above, the following operations are repeatedly executed in the transceiving section 510 as well as the detecting section 520 containing the switches 522, 523 and 524 based on the write signal WR and the control signals:

(1) When the write signal WR is logically at the low level, the transistor 51 is turned on. At this time, the switches 522 and 523 are switched on and the switch 524 is switched off. Thereby, the maximum current Imax flows through the antenna coil 4 similarly to the first embodiment and the maximum electric charge is charged in the detecting capacitor 521, increasing an inter-terminal voltage to several hundred volts;

(2) When the write signal WR is logically at the high level, the transistor 51 is turned off. At this time, all of the switches 522, 523 and 524 are switched off. Thereby, the current corresponding to the resistance of the resistor 511 flows through the antenna coil 4 as the minimum Imin and the electric charge charged in the detecting capacitor 521 is held as each switch is turned off; and (3) When the write signal WR shifts from the logic high level to the logic low level, the switches 522 and 523 are switched off and the switch 524 is switched on, respectively. The transistor is turned on at this time. Although the current flowing through the antenna coil 4 gradually increases normally as the transistor 51 is turned on, the electric charge in the detecting capacitor 521 moves rapidly from the capacitor 521 to the resonance capacitor 41 being charged at that moment as the switch 524 is turned on. Further, because the switch 522 is turned off at this time, the current flowing through the antenna coil 4 and the electric charge charged in the capacitor 41 will not leak to the detecting section 520 via the point b.

Figure 16:
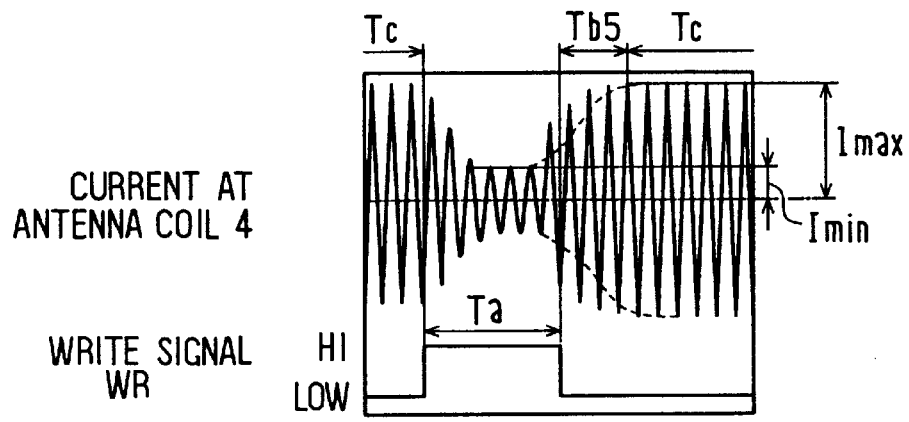
FIG. 16 is a graph of a waveform of an output current according to the fifth embodiment.

FIG. 16 shows a transition of the current flowing through the antenna coil 4 corresponding to such operation of the transceiver (the transmitting/receiving section 510 and the detecting section 520) during writing. Because the electric charge charged in the detecting capacitor 521 is forcibly moved to the resonance capacitor 41 in switching the antenna coil 4 from the minimum driving to the maximum driving as described above in the system of the fifth embodiment, the current rises more quickly than the driving current of the first embodiment which is denoted by a broken line in FIG. 16. Accordingly, the efficiency for supplying power to the antenna coil 4 is improved that much greater than in the system of the first embodiment.

Figure 17A:
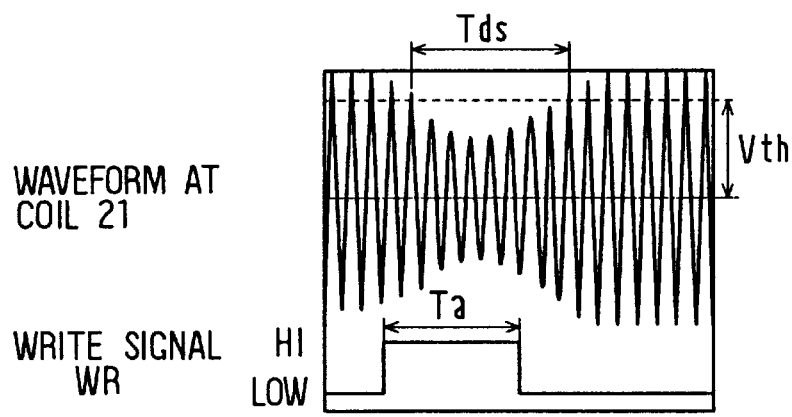
FIGS. 17A and 17B are graphs of waveforms of signals received by a transponder according to the fifth embodiment.
Figure 17B:
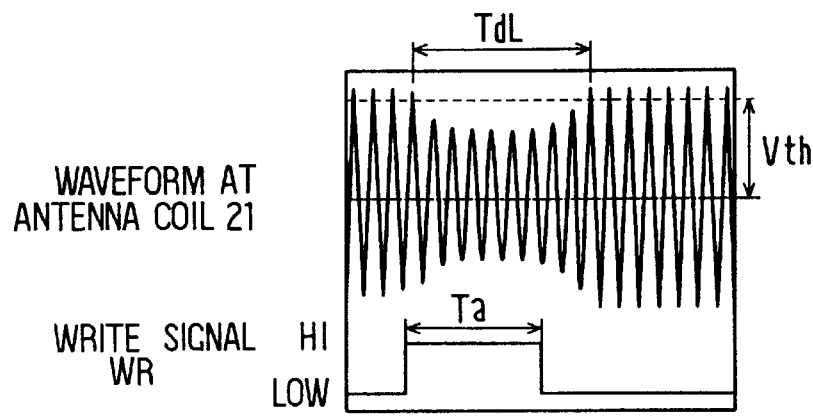

Meanwhile, FIGS. 17A and 17B show waveforms of signals received by the transponder 2 in the system of the fifth embodiment in correspondence to FIGS. 33A and 33B or FIGS. 3A and 3B.

As shown in FIGS. 17A and 17B, because the driving current rises quickly in the system of the fifth embodiment, the logic low level determination periods TdS and TdL are shortened that much more than the system of the first embodiment and the transition of the determination period Td corresponding to the distance X turns out as indicated by a solid line L5 in FIG. 34. That is, the writable range may be expanded more efficiently than the system of the first embodiment.

As described above, the automatic answering system of the fifth embodiment also allows the effects (A) and (B) of the first embodiment to be increased further. Although the maximum current Imax has been increased by adopting the bridge type complementary circuit for the driving circuit of the antenna coil 4 in the system of the present embodiment, the driving circuit need not be of the bridge type.

Further, the structure described above for forcibly moving the electric charge stored in the detecting capacitor 521 to the resonance capacitor 41 in switching the antenna coil 4 from minimum driving to maximum driving during the amplitude modulation does not always require the circuit for adding the offset current Imin as described above. That is, even if no circuit for adding the offset current exists, this structure allows the efficiency for supplying power to the transponder to be improved and the writable range to be expanded as compared to the prior art system.

[Sixth Embodiment]

In such automatic answering systems using the transponder, generally more power is consumed in transmitting a code from the antenna coil to the transponder (during writing) rather than in answering a code from the transponder to the antenna coil (during reading). Therefore, the communicable range during writing is normally smaller than that during reading.

Further, also in the transponder, normally less electric charge is stored in the transponder at the time when the power supply is turned on, i.e., right after the time when it has received the supply of the power, as compared to the stationary state in which the transponder is providing the identification code repeatedly to the antenna coil during reading. Therefore, the communicable range at the time when the power supply is turned on is smaller than that during the stationary time afterwards.

Figure 18:
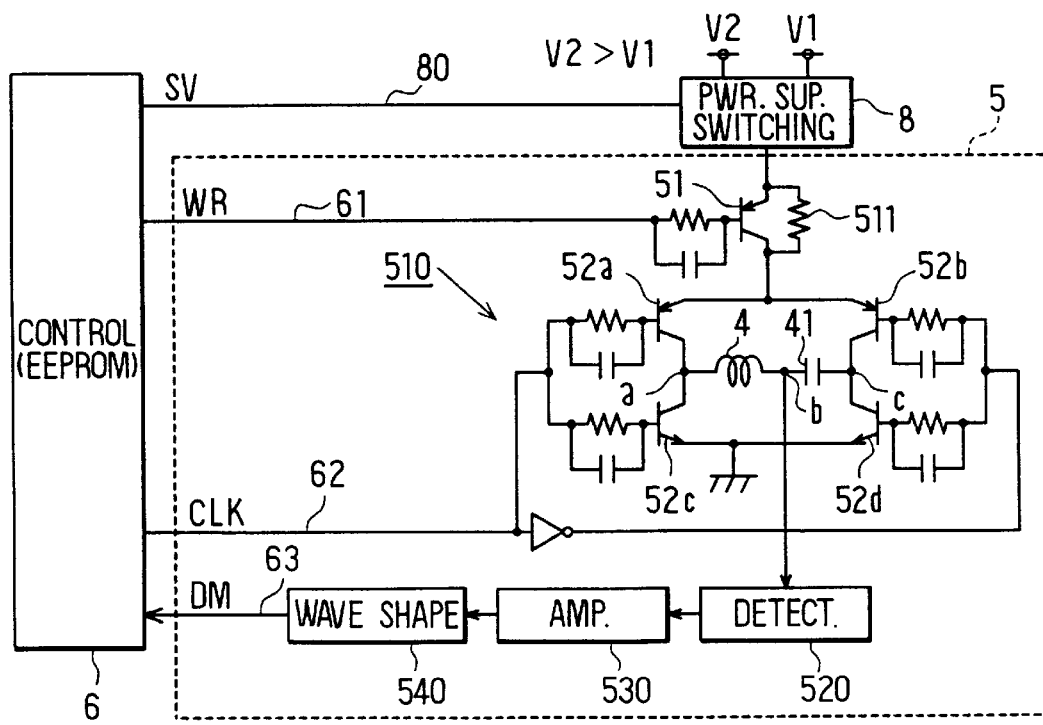
FIG. 18 is a circuit diagram of a transceiver according to a sixth preferred embodiment of the present invention.

FIG. 18 shows one system which can deal with such problems of the automatic answering system effectively. In the system of the sixth embodiment, two kinds of voltages V1 and V2 which are in a relationship of V1<V2 are used and are supplied to the transceiver 5 by switching these power-supply voltages V1 and V2 by a power-supply switching circuit 8 as the power-supply voltage Vcc as shown in FIG. 18.

Here, among the above-mentioned power-supply voltages V1 and V2, the voltage V1 is assumed to be a minimum necessary voltage which allows the communicable range required during reading to be obtained in the above-mentioned stationary state and the voltage V2 is assumed to be a minimum necessary voltage which allows the communicable range required at the time when the power supply is turned on or during writing to be obtained. Further, the power-supply switching circuit 8 is constructed as a circuit for switching the power-supply voltage to be supplied selectively based on a power-supply switching signal SV applied from the control circuit 6 via a signal line 80.

The power-supply switching operation of the power-supply switching circuit 8 based on the power-supply switching signal SV will be explained below with reference to FIGS. 19A–19C. The power-supply switching circuit 8 executes the following operations repeatedly corresponding to the code communication between the transceiver 5 and the transponder 2 via the antenna coil 4:

(1) When the driver inserts the key 1 into the key cylinder 3, the key unlock warning switch 31 is turned on and, based on that, the power supply is turned on by which electric power is supplied from the transceiver 5 to the transponder 2, the power-supply voltage V2 is selectively output by a time tr (e.g., several tens of milliseconds) when the power-supply switching signal SV turns to a logic high level for the time tr;

(2) During the stationary reading time for reading the identification code from the transponder 2 after that, the power-supply voltage V1 is selectively output when the power-supply switching signal SV goes to logic low level; and (3) When the identification code is written to the transponder 2, the power-supply voltage V2 is selectively output for a time tw (e.g., several hundred milliseconds) when the power-supply switching signal SV goes to the logic high level for the time tw. Such operation of the power-supply switching circuit 8 allows the communicable range to be steadily expanded when the power supply is turned on or during writing while suppressing the increase of the overall power consumption.

Then, due to that, the transition of the logic low level determination period Td corresponding to the distance X from the antenna coil 4 in the transponder 2 turns out as indicated by a solid line L6, for example, as shown in FIG. 34, thus expanding the writable range. In this case, the level in the direction of Td of the solid line L6 in FIG. 34 is decided corresponding to the magnitude of the power-supply voltage V2 switched and output as described above.

FIGS. 20 through 24 illustrate versions of the power-supply switching circuit 8. FIG. 20 shows an example of the power-supply switching circuit 8 using a PNP bipolar transistor 81a and a diode 82. In contrast to FIGS. 19A–19C, the transistor 81a is turned on and the higher power-supply voltage V2 is supplied to the transceiver 5 when the power-supply switching signal SV is logically at the low level and the transistor 81a is turned off and the lower power-supply voltage V1 is supplied to the transceiver 5 when the power-supply switching signal SV goes to the logic high level in this example. Accordingly, in this case, the control circuit 6 controls the power-supply switching signal SV to the logic low level when the power supply is turned on or during writing and controls the power-supply switching signal SV to the logic high level during reading, respectively.

FIG. 21 shows an example of the power-supply switching circuit 8 using a P-channel MOSFET 81b instead of the bipolar transistor in FIG. 20. This also allows the same power supply switching operation with that of the circuit shown in FIG. 20 to be achieved.

Figure 22:
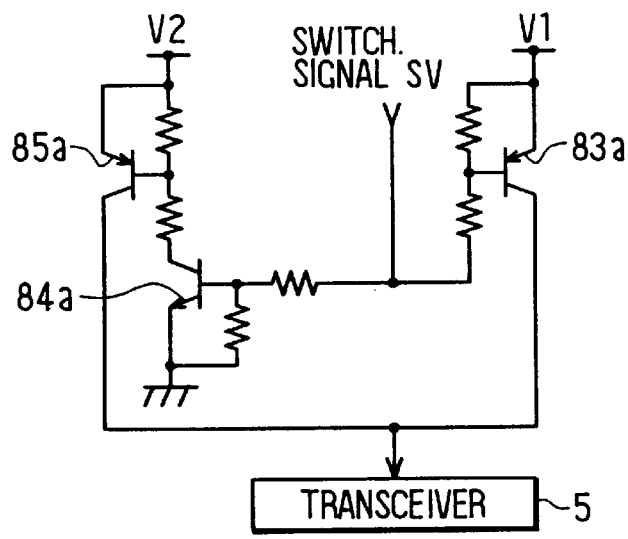

FIG. 22 shows an example of the power-supply switching circuit 8 using a PNP bipolar transistor 83a and an NPN bipolar transistor 84a. In this example, the transistor 83a is turned on and the lower power supply voltage V1 is supplied to the transceiver 5 when the power-supply switching signal SV is logically at the low level and the transistors 84a and 85a are turned on and the higher power-supply voltage V2 is supplied to the transceiver 5 when the power-supply switching signal SV turns to logic high level, similarly to the case shown in FIGS. 19A–19C. Accordingly, the control circuit 6 sets the power-supply switching signal SV to the logic high level when the power supply is turned on or during writing and controls the power-supply switching signal SV to the logic low level during the stationary reading in this case as shown in FIGS. 19A–19C.

Figure 23:
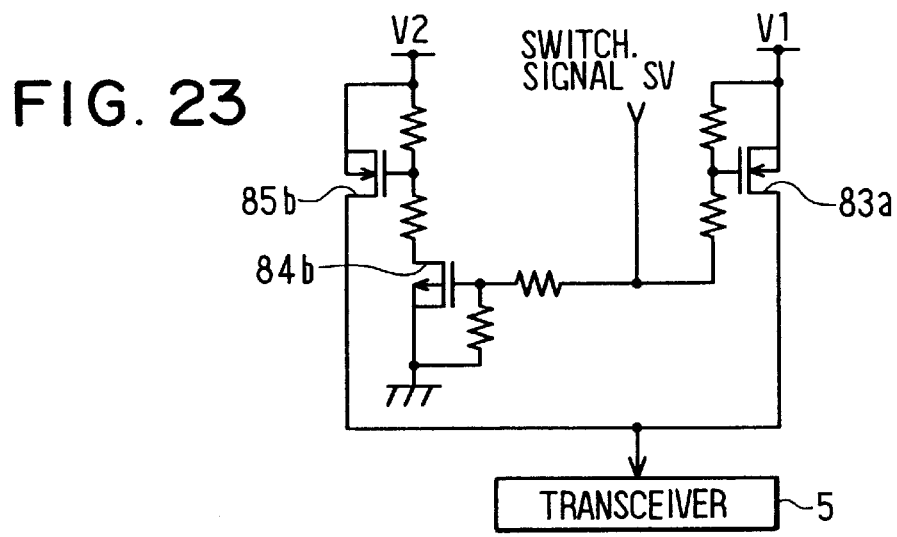

FIG. 23 shows an example of the power-supply switching circuit 8 using P-channel MOSFETs 83b and 85b instead of the PNP bipolar transistors 83a and 85a in FIG. 22 and using an N-channel MOSFET 84b instead of the NPN bipolar transistor 84a in FIG. 22. This circuit also allows the same power supply switching operation with that of the circuit shown in FIG. 22 to be achieved.

Figure 24:
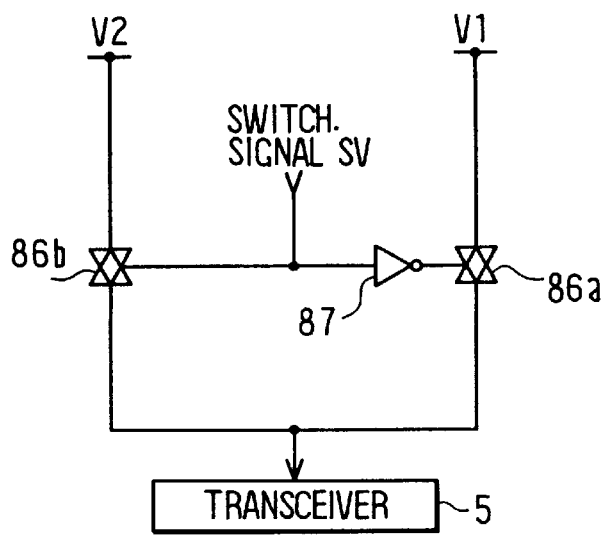
Figure 25:
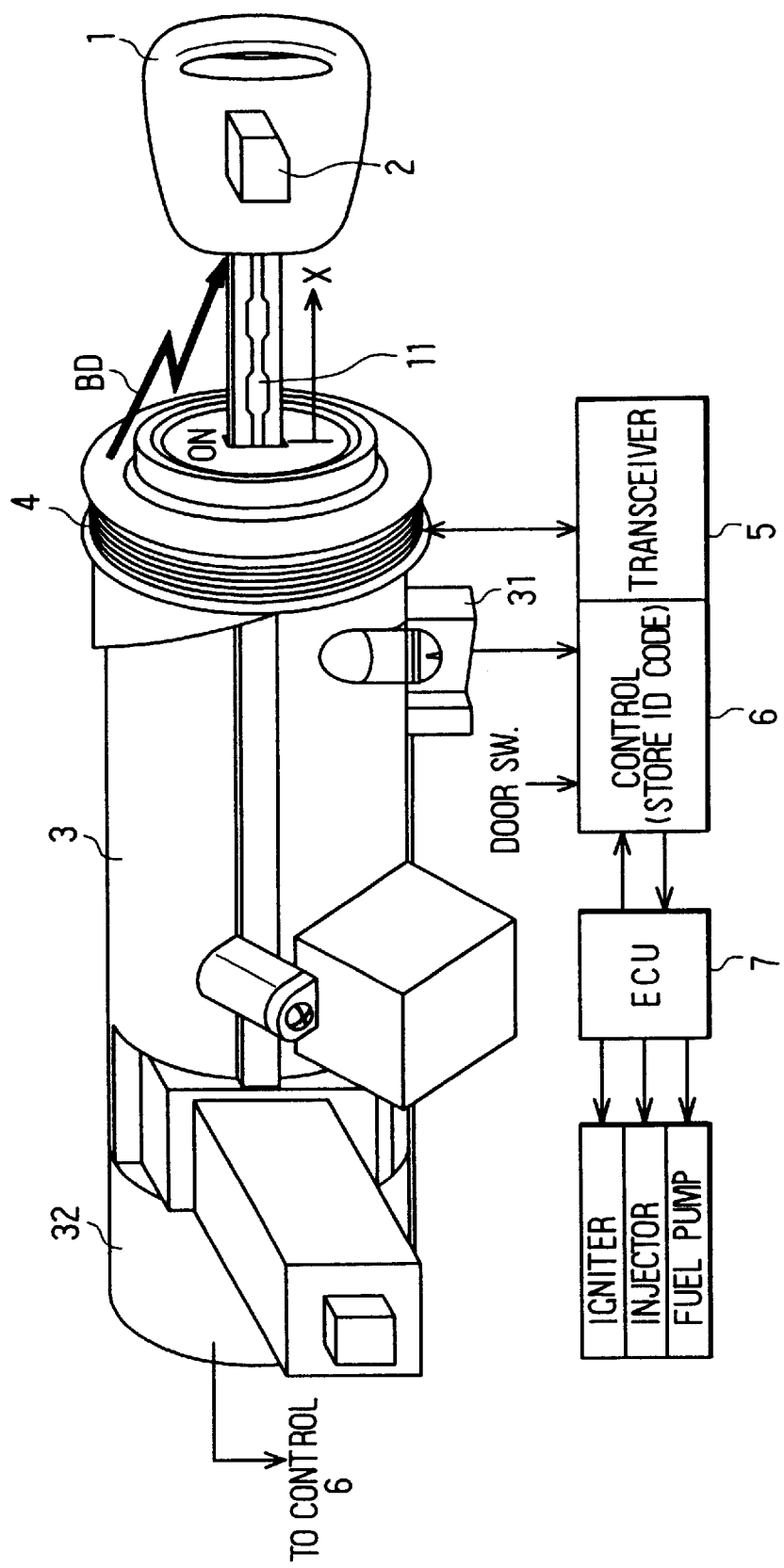
FIG. 25 is a perspective view of a vehicle anti-theft system according to the prior art.
Figure 26:
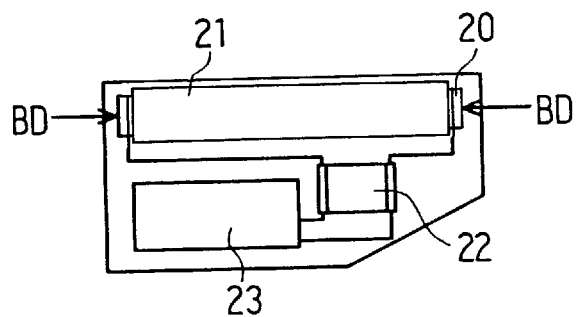
FIG. 26 shows the internal structure of a transponder according to the prior art.
Figure 27:
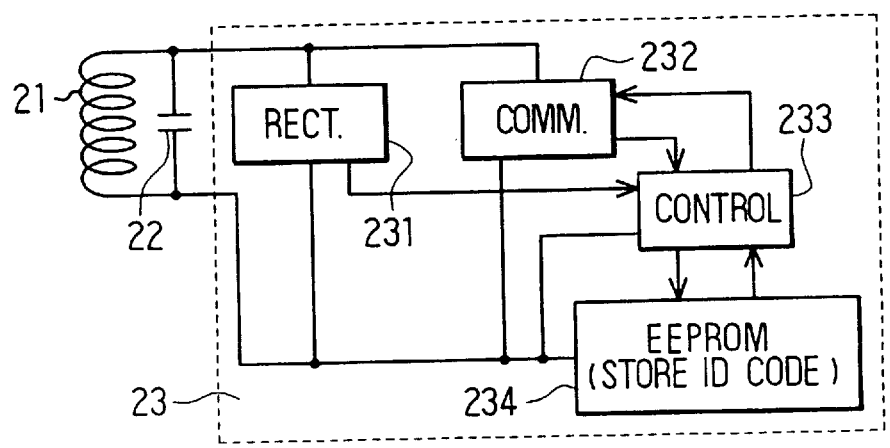
FIG. 27 is a block diagram of the electrical structure of a transponder according to the prior art.

FIG. 24 shows an example of the power-supply switching circuit 8 using analog switches 86a and 86b and an inverter 87. In this example, the analog switch 86a is turned on and the lower power-supply voltage V1 is supplied to the transceiver 5 when the power-supply switching signal SV is logically at the low level and the analog switch 86b is turned on and the higher power-supply voltage V2 is supplied to the transceiver 5 when the power-supply switching signal SV goes to the logic high level, similarly to the case shown in FIGS. 19A–19C.

As described above, in addition to the effects (A) and (B) of the first embodiment, the system of the sixth embodiment brings about the favorable effect that:

(D) it allows the communicable range to be steadily expanded when the power supply is turned on or during writing while suppressing an increase in overall power consumption.

Although the case in which the structure using the power-supply switching circuit 8 is applied to the system of the first embodiment has been explained for convenience in the sixth embodiment, it is needless to say that such a structure using the power-supply switching circuit 8 may be applied in the same manner to the systems of all other embodiments.

Further, the structure using the power-supply switching circuit 8 will do if it basically has a structure including a plurality of power feeding units having different power feeding capabilities as power feeding units for supplying the current to the antenna coil 4 along driving and switching and using those power feeding units corresponding to the code communication between the antenna coil 4 and the transponder 2. By adopting at least such structure, the sensitivity may be adjusted corresponding to the communication state between the antenna coil and the transponder and more stable and efficient code communication may be realized between them.

Further, these structures switching and using the power feeding units corresponding to the communication state are effective in expanding the communicable range not only when the amplitude modulation system is adopted for the code communication but also when a frequency modulation system or the like is adopted.

Although the present invention has been fully described in connection with the preferred embodiment thereof with reference to the accompanying drawings, various changes and modifications will become apparent to those skilled in the art. Such changes and modifications are to be understood as being included within the scope of the present invention as defined by the appended claims.

What is claimed is:

1. An automatic answering system for performing code communication by way of amplitude modulation with an electromagnetically coupled transponder, said system comprising:

an antenna coil for being electromagnetically coupled with said transponder to convey a carrier signal and operating power thereto;

driving means for driving said antenna coil based on said carrier signal; and driving control means for controlling a driving mode of said driving means based on a modulation control signal for modulation of said carrier signal;

wherein said driving control means includes offset adding means for adding a predetermined offset to a minimum value of current flowing through said antenna coil to control said driving mode by minimizing time required for the current to reach a maximum value in response to said modulation control signal, to thereby maximize power transmission to the transponder and to thereby increase a communication range of the system.

2. The system using the transponder according to claim 1, wherein said offset adding means is for adding different offsets in a plurality of predetermined stages and for switching offsets to be added automatically corresponding to a communication environment of said system and said transponder.

3. The system of claim 1, wherein said driving means is formed by bridging a complementary circuit of transistors or FETS.

4. The automatic answering system of claim 1, wherein said antenna coil forms part of an LC resonance circuit by being electrically connected to a resonance capacitor.

5. An automatic answering system for performing code communication by way of amplitude modulation with an electromagnetically coupled transponder, said system comprising:

an antenna coil for being electromagnetically coupled with said transponder;

driving means for driving said antenna coil based on said carrier signal; and driving control means for controlling a driving mode of said driving means based on a modulation control signal for modulation of said carrier signal;

wherein said driving control means includes offset adding means for adding a predetermined offset to a minimum value of current flowing through said antenna coil to control said driving mode, said antenna coil forms part of an LC resonance circuit by being electrically connected to a resonance capacitor, and said LC resonance circuit has a first capacitor charged when said antenna coil is driven at a maximum during said amplitude modulation and a second capacitor charged when said antenna coil is driven at a minimum during said amplitude modulation and these first and second capacitors are switched and used based on said modulation control signal.

6. An automatic answering system for performing code communication by way of amplitude modulation with an electromagnetically coupled transponder, said system comprising:

an antenna coil for being electromagnetically coupled with said transponder;

driving means for driving said antenna coil based on said carrier signal; and driving control means for controlling a driving mode of said driving means based on a modulation control signal for modulation of said carrier signal;

wherein said driving control means includes offset adding means for adding a predetermined offset to a minimum value of current flowing through said antenna coil to control said driving mode, said antenna coil forms part of an LC resonance circuit by being electrically connected to a resonance capacitor, and said system further comprises detecting means including a rectifier diode for rectifying a signal received by said antenna coil and a smoothing capacitor for smoothing the rectified signal, and charge moving means for moving electric charge stored in said smoothing capacitor to said resonance capacitor when switching from the minimum driving to the maximum driving of said antenna coil during said amplitude modulation.

7. An automatic answering system for performing code communication by way of amplitude modulation with an electromagnetically coupled transponder, said system comprising:

an antenna coil for being electromagnetically coupled with said transponder;

driving means for driving said antenna coil based on a carrier signal; and driving control means for controlling a driving mode of said driving means based on a modulation control signal for modulation of said carrier signal;

a plurality of power feeding means, having different power feeding capability, for supplying power to said antenna coil and for being switched and used corresponding to a communication state between said antenna coil and said transponders;

wherein said driving control means includes offset adding means for adding a predetermined offset to a minimum value of current flowing through said antenna coil to control said driving mode.

8. The system of claim 7, wherein said power feeding means comprises:

first power feeding means, having a first power feeding capability, for supplying power to said antenna coil; and second power feeding means, having a second power feeding capability which is higher than said first power feeding capability, for supplying power to said antenna coil;

wherein said second power feeding means is for being used when a power supply of said system is turned on and when a code is transmitted from said antenna coil to said transponder; and said first power feeding means is for being used when a code is provided from said transponder to said antenna coil.

9. An automatic answering system for performing code communication with an electromagnetically coupled transponder, said system comprising:

an LC resonance circuit composed of an antenna coil for being electromagnetically coupled to said transponder, and a capacitor electrically connected to said antenna coil;

driving means for driving said antenna coil based on a carrier signal; and driving control means for controlling a driving mode of said driving means based on a modulation control signal of said carrier signal;

wherein said LC resonance circuit has a first capacitor charged when said antenna coil is driven at a maximum during said amplitude modulation and a second capacitor charged when said antenna coil is driven at a minimum during said amplitude modulation and that these first and second capacitors are switched and used based on said modulation control signal.

10. The system of claim 9, further comprising a plurality of power feeding means, having different power feeding capability, for supplying power to said antenna coil and for being switched and used corresponding to a communication state between said antenna coil and said transponder.

11. The system of claim 10, wherein said power feeding means comprises:

first power feeding means, having a first power feeding capability, for supplying power to said antenna coil; and second power feeding means, having a second power feeding capability which is higher than said first power feeding capability, for supplying power to said antenna coil;

wherein said second power feeding means is for being used when a power supply of said system is turned on and when a code is transmitted from said antenna coil to said transponder; and said first power feeding means is for being used when a code is provided from said transponder to said antenna coil.

12. An automatic answering system for performing code communication with an electromagnetically coupled transponder, said system comprising:

an LC resonance circuit including an antenna coil for being electromagnetically coupled to said transponder and a capacitor electrically connected to said antenna coil;

driving means for driving said antenna coil based on a carrier signal;

driving control means for controlling a driving mode of said driving means based on a modulation control signal for modulation of said carrier signal;

detecting means including a rectifier diode for rectifying a signal received by said antenna coil and a smoothing capacitor for smoothing the rectified signal; and charge moving means for moving electric charge stored in said smoothing capacitor to said resonance capacitor when switching from the minimum driving to the maximum driving of said antenna coil during said amplitude modulation.

13. The system of claim 12, further comprising a plurality of power feeding means, having different power feeding capability, for supplying power to said antenna coil and for being switched and used corresponding to a communication state between said antenna coil and said transponder.

14. The system of claim 13, wherein said power feeding means comprises:

first power feeding means, having a first power feeding capability, for supplying power to said antenna coil; and second power feeding means, having a second power feeding capability which is higher than said first power feeding capability, for supplying power to said antenna coil;

wherein said second power feeding means is for being used when a power supply of said system is turned on and when a code is transmitted from said antenna coil to said transponder; and said first power feeding means is for being used when a code is provided from said transponder to said antenna coil.

15. An automatic answering machine for performing code communication with an electromagnetically coupled transponder, said system comprising:

an antenna coil for being electromagnetically coupled with said transponder to convey a carrier signal and operating power thereto;

driving means for driving said antenna coil based on said carrier signal; and driving control means for controlling a driving mode of said driving means based on a modulation control signal for modulation of said carrier signal;

wherein said driving means includes a bridged MOSFET or junction type FET complementary circuit that minimizes time required to reach an active communication state based on said modulation control signal, between said antenna coil and said transponder, thereby increasing a code communication range of the system.

16. The system of claim 15, wherein said antenna coil forms part of an LC resonance circuit by being electrically connected with a resonance capacitor.

17. An automatic answering machine for performing code communication with an electromagnetically coupled transponder, said system comprising:

an antenna coil for being electromagnetically coupled with said transponder;

driving means for driving said antenna coil based on a carrier alternating signal;

driving control means for controlling a driving mode of said driving means based on a modulation control signal for modulation of said carrier signal; and a plurality of power feeding means, having different power feeding capability, for supplying power to said antenna coil and for being switched and used corresponding to a communication state between said antenna coil and said transponders;

wherein said driving means includes a bridged MOSFET or junction type FET complementary circuit.

18. The system of claim 17, wherein said power feeding means comprises:

first power feeding means, having a first power feeding capability, for supplying power to said antenna coil; and second power feeding means, having a second power feeding capability which is higher than said first power feeding capability, for supplying power to said antenna coil;

wherein said second power feeding means is for being used when a power supply of said system is turned on and when a code is transmitted from said antenna coil to said transponder; and said first power feeding means is for being used when a code is provided from said transponder to said antenna coil.

* * * * *